United States Patent
Sun et al.

(10) Patent No.: US 10,560,393 B2
(45) Date of Patent: Feb. 11, 2020

(54) CONTROLLING A JITTER BUFFER

(71) Applicant: DOLBY LABORATORIES LICENSING CORPORATION, San Francisco, CA (US)

(72) Inventors: Xuejing Sun, Beijing (CN); Zhiwei Shuang, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 294 days.

(21) Appl. No.: 14/654,346

(22) PCT Filed: Dec. 19, 2013

(86) PCT No.: PCT/US2013/076387
§ 371 (c)(1),
(2) Date: Jun. 19, 2015

(87) PCT Pub. No.: WO2014/100331
PCT Pub. Date: Jun. 26, 2014

(65) Prior Publication Data
US 2015/0350099 A1  Dec. 3, 2015

Related U.S. Application Data

(60) Provisional application No. 61/759,023, filed on Jan. 31, 2013.

(30) Foreign Application Priority Data

Dec. 20, 2012 (CN) .......................... 2012 1 0560747

(51) Int. Cl.
*H04L 12/875* (2013.01)
*H04L 12/841* (2013.01)

(52) U.S. Cl.
CPC ............ *H04L 47/56* (2013.01); *H04L 47/283* (2013.01)

(58) Field of Classification Search
None
See application file for complete search history.

(56) References Cited

U.S. PATENT DOCUMENTS 6,259,677 B1  7/2001  Jain
6,452,950 B1  9/2002  Ohlsson
(Continued)

FOREIGN PATENT DOCUMENTS

| EP | 1919137 | 5/2008 |
|---|---|---|
| EP | 3011692 | 4/2016 |
| WO | 2008/068167 | 6/2008 |

OTHER PUBLICATIONS

Jing Liu et al. "An adaptive Receiver Buffer Adjust Algorithm for VoIP Applications Considering Voice Characters", 2004, pp. 597-601.*

(Continued)

*Primary Examiner* — Adnan Baig

(57) ABSTRACT

Apparatus and methods for controlling a jitter buffer are described. In one embodiment, the apparatus for controlling a jitter buffer includes an inter-talkspurt delay jitter estimator for estimating an offset value of the delay of a first frame in the current talkspurt with respect to the delay of a latest anchor frame in a previous talkspurt, and a jitter buffer controller for adjusting a length of the jitter buffer based on a long term length of the jitter buffer for each frame and the offset value.

20 Claims, 13 Drawing Sheets

User A

User B

(56) References Cited

U.S. PATENT DOCUMENTS

| | | |
|---|---|---|
| 6,658,027 B1 | 12/2003 | Kramer |
| 6,683,889 B1 | 1/2004 | Shaffer |
| 6,684,273 B2 | 1/2004 | Boulandet |
| 6,747,999 B1* | 6/2004 | Grosberg ............ H04J 3/0632 370/235 |
| 6,862,298 B1 | 3/2005 | Smith |
| 7,246,057 B1 | 7/2007 | Sundqvist |
| 7,266,127 B2 | 9/2007 | Gupta |
| 7,450,601 B2 | 11/2008 | Sundqvist |
| 7,496,086 B2 | 2/2009 | Eckberg |
| 7,499,472 B2 | 3/2009 | Spitzer |
| 7,502,733 B2 | 3/2009 | Andrsen |
| 7,573,894 B2 | 8/2009 | Schulz |
| 7,596,488 B2 | 9/2009 | Florencio |
| 7,680,099 B2 | 3/2010 | Lakaniemi |
| 7,746,770 B2 | 6/2010 | Usuda |
| 7,826,441 B2 | 11/2010 | Black |
| 7,852,882 B2 | 12/2010 | Jougit |
| 7,957,426 B1 | 6/2011 | Choudhury |
| 8,081,622 B2 | 12/2011 | Makiuchi |
| 8,085,678 B2 | 12/2011 | Spindola |
| 8,089,992 B2 | 1/2012 | Chen |
| 8,218,579 B2 | 7/2012 | Liu |
| 8,243,721 B2 | 8/2012 | Yang |
| 2002/0172229 A1 | 11/2002 | Parvin |
| 2004/0120309 A1 | 6/2004 | Kurittu |
| 2005/0083938 A1 | 4/2005 | Newson |
| 2006/0187970 A1 | 8/2006 | Lee |
| 2007/0047515 A1 | 3/2007 | Jonsson |
| 2007/0081562 A1* | 4/2007 | Ma ................ H04N 21/23406 370/516 |
| 2008/0240004 A1 | 10/2008 | Shaffer |
| 2009/0003369 A1* | 1/2009 | Lundin ............... H04J 3/0632 370/412 |
| 2010/0034332 A1* | 2/2010 | Enstrom ............ H04L 47/2483 375/371 |
| 2010/0290454 A1* | 11/2010 | Lundberg ............ H04J 3/0632 370/352 |
| 2010/0315960 A1 | 12/2010 | Li |
| 2012/0123774 A1 | 5/2012 | Choi |

OTHER PUBLICATIONS

Yashiro, a et al "PD Controller with LPF based Jitter Buffer for Real-Time Communication" The 12th IEEE International Workshop on Advanced Motion Control, Mar. 25-27, 2012, Sarajevo, Bosnia and Herzegovina.

Tie, C. et al "Adaptive Jitter Buffer Algorithm of VoIP based on Speech Quality Prediction" published on Feb. 21, 2006.

Mukhopadhyay, A. et al "An Adaptive Jitter Buffer Playout Algorithm for Enhanced VoIP Performance" Advances in Computing and Information Technology Communications in Computer and Information Science, vol. 198, 2011, pp. 219-230.

Madhani, S. et al "Optimized Adaptive Jitter Buffer Design for Wireless Internet Telephony" IEEE Global Telecommunications Conference, Nov. 26-30, 2007, pp. 5248-5253, Washington, D.C.

Oklander, B. et al "Jitter Buffer Analysis" IEEE Conference on Computer Communications and Networks, Aug. 3-7, 2008, pp. 1-6.

Liang, Y.J. et al "Adaptive Playout Scheduling Using Time-Scale Modification in Packet Voice Communications" IEEE International Conference on Acoustics, Speech, and Signal Processing, May 7-11, 2001, pp. 1445-1448, vol. 3.

Issing, J. et al "Flexible Playout Adaptation for Low Delay AAC RTP Communication" Communication Systems and Networks, 2011 Third International Conference, Jan. 4-8, 2011.

Atzori, L. et al "Playout Buffering in IP Telephony: A Survey Discussing Problems and Approaches", IEEE Communications Surveys & Tutorials, vol. 8, No. 3, pp. 36-46, 2006.

Skoglund, J. et al "Voice Over IP: Speech Transmission Over Packet Networks" Springer Handbook of Speech Processing, pp. 307-330, 2008.

http://tools.ietf.org/rfc/rfc5481.txt.

Liu, J. et al "An Adaptive Receiver Buffer Adjust Algorithm for VoIP Applications Considering Voice Characters" Joint Conference of the 10th Asia-Pacific Conference on Communications and the 5th International Symposium on Multi-Dimensional Mobile Communications Proceedings, Beijing, China, Aug. 29-Sep. 1, 2004, pp. 597-601.

Gournay, P. et al "Improved Packet Loss Recovery Using Late Frames for Prediction-Based Speech Coders" IEEE International Conference on Acoustics, Speech, and Signal Processing, Apr. 6-10, 2003, pp. I-108-I-111.

Liang, Y.J. et al. "Adaptive Playout Scheduling Using Time-Scale Modification in Packet Voice Communications" IEEE International Conference on Acoustics, Speech, and Signal Processing, May 7-11, 2001, pp. 1445-1448.

* cited by examiner

| | | | | | |
|---|---|---|---|---|---|
| t1, last talkspurt |  | | | | |
| t2, last + current talkspurts, without dropping |  | | | | |
| t2, last + current talkspurts, with dropping |  | | | | |

CONTROLLING A JITTER BUFFER

CROSS-REFERENCE TO RELATED APPLICATIONS

This application claims priority to Chinese Patent Application No. 201210560747.3 filed 20 Dec. 2012 and U.S. Provisional Patent Application No. 61/759,023 filed 31 Jan. 2013, which is hereby incorporated by reference in its entirety.

TECHNICAL FIELD

The present application relates generally to audio signal processing. More specifically, embodiments of the present application relate to apparatus and methods for controlling a jitter buffer.

BACKGROUND

Voice transmission over packet networks is subject to delay variation, commonly known as jitter, due to highly heterogeneous network conditions. In IP-based networks, fixed delay can be attributed to algorithmic, processing and propagation delays due to material and distance, whereas variable delay is caused by the fluctuation of IP network traffic, different transmission path over the internet, etc. VoIP (voice over Internet Protocol) receivers generally rely on a "jitter buffer" to counter the negative impact of jitter. Here the packet delay variation, or jitter, is defined as the difference between the actual arrival time of the packets and a reference clock at the normal packet rate. By introducing an additional "playout" delay, a jitter buffer aims at transforming the uneven flow of arriving packets into a regular flow of packets, such that delay variations will not cause perceptual quality degradation to the end users. Voice communication is highly delay sensitive, where one-way delay should be kept below 150 ms for normal conversation, with above 400 ms being considered unacceptable (ITU Recommendation G.114). Therefore, the additional delay added by a jitter buffer needs to be as small as possible. Unfortunately, a small jitter buffer will lead to more frequent packet loss when packets arrive later than their expected playout deadline due to jittered network.

Various jitter buffer management methods have been proposed in an aim to find an optimal balance between delay and packet loss. In a typical jitter buffer algorithm, the incoming packets are stored in a buffer, along with metadata, like sequence numbers etc. After certain amount of time, e.g. 20 ms, the oldest packet from the jitter buffer will be sent to the decoder. New packets are inserted into the jitter buffer based on their sequence number accordingly. Two general approaches exist in jitter buffer design, namely fixed jitter buffer and adaptive jitter buffer. A jitter buffer with fixed size provides a constant buffer delay and incurs minimum complexity. Obviously it can introduce excessive delay if large delay variations need to be accommodated. Adaptive jitter buffer allocates the size dynamically, which are more commonly used in practice.

There is a need to further improve the jitter buffer management algorithm such that an optimal overall perceived quality can be achieved.

SUMMARY

According to an embodiment of the application, an apparatus for controlling a jitter buffer is provided, including: an inter-talkspurt delay jitter estimator for estimating an offset value of the delay of a first frame in the current talkspurt with respect to the delay of a latest anchor frame in a previous talkspurt; and a jitter buffer controller for adjusting a length of the jitter buffer based on a long term length of the jitter buffer for each frame and the offset value.

According to another embodiment of the application, an apparatus for controlling a jitter buffer includes a long term length estimator for estimating a long term length of the jitter buffer for each frame by calculating a statistic distribution of history delay jitter values; and a jitter buffer controller for setting the length of the jitter buffer. In the apparatus, the jitter buffer controller is configured to set the length of the jitter buffer for the first frame of the current talkspurt based on the long term length for the first frame and the number of frames received at the same time with the first frame.

Another embodiment of the application involves an apparatus for controlling a jitter buffer, which includes a long term length estimator for estimating a long term length of the jitter buffer for each frame by calculating a statistic distribution of history delay jitter values; and a jitter buffer controller for adjusting the present length of the jitter buffer toward the long term length.

Yet another embodiment of the application provides an apparatus for controlling a jitter buffer, including a jitter buffer monitor for monitoring occupancy of the jitter buffer, and a jitter buffer controller for increasing the length of the jitter buffer in response to the occupancy meeting a predefined condition.

The application also provides a method for controlling a jitter buffer. According to one embodiment of the method, it includes estimating an offset value of the delay of a first frame in the current talkspurt with respect to the delay of a latest anchor frame in a previous talkspurt; and adjusting a length of the jitter buffer based on a long term length of the jitter buffer for each frame and the offset value.

According to another embodiment of the method, a long term length of the jitter buffer for each frame is estimated by calculating a statistic distribution of history delay jitter values; and the length of the jitter buffer for the first frame of the current talkspurt is set based on the long term length for the first frame and the number of frames received at the same time with the first frame.

Another embodiment of the method involves estimating a long term length of the jitter buffer for each frame by calculating a statistic distribution of history delay jitter values; and then adjusting the present length of the jitter buffer toward the long term length.

Yet another embodiment of the method includes monitoring occupancy of the jitter buffer, and then increasing the length of the jitter buffer in response to the occupancy meeting a predefined condition.

BRIEF DESCRIPTION OF DRAWINGS

The present application is illustrated by way of example, and not by way of limitation, in the figures of the accompanying drawings and in which like reference numerals refer to similar elements and in which.

DETAILED DESCRIPTION

Figure 1A:
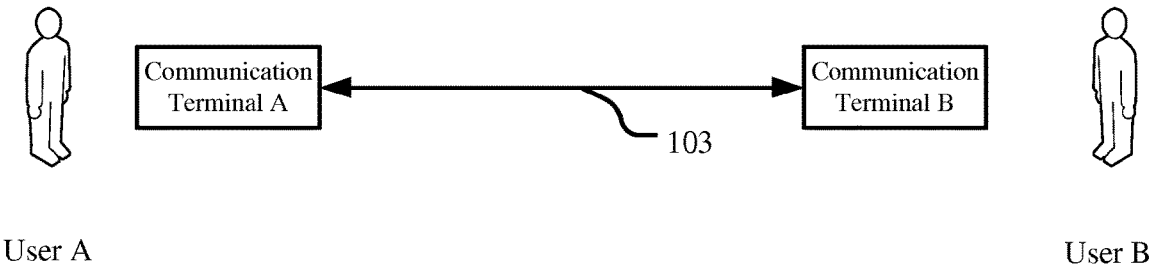
FIG. 1A is a diagram schematically illustrating an exemplary voice communication system where embodiments of the application can be applied.

The embodiments of the present application are below described by referring to the drawings. It is to be noted that, for purpose of clarity, representations and descriptions about those components and processes known by those skilled in the art but not necessary to understand the present application are omitted in the drawings and the description.

As will be appreciated by one skilled in the art, aspects of the present application may be embodied as a system, a device (e.g., a cellular telephone, a portable media player, a personal computer, a server, a television set-top box, or a digital video recorder, or any other media player), a method or a computer program product. Accordingly, aspects of the present application may take the form of an hardware embodiment, an software embodiment (including firmware, resident software, microcodes, etc.) or an embodiment combining both software and hardware aspects that may all generally be referred to herein as a "circuit," "module" or "system." Furthermore, aspects of the present application may take the form of a computer program product embodied in one or more computer readable mediums having computer readable program code embodied thereon.

Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic or optical signal, or any suitable combination thereof.

A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, RF, etc., or any suitable combination of the foregoing.

Computer program code for carrying out operations for aspects of the present application may be written in any combination of one or more programming languages, including an object oriented programming language such as Java, Smalltalk, C++ or the like and conventional procedural programming languages, such as the "C" programming language or similar programming languages. The program code may execute entirely on the user's computer as a stand-alone software package, or partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present application are described below with reference to flowchart illustrations and/or block diagrams of methods, apparatus (systems) and computer program products according to embodiments of the application. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

System Overview

FIG. 1A is a diagram schematically illustrating an example voice communication system where embodiments of the application can be applied.

As illustrated in FIG. 1A, user A operates a communication terminal A, and user B operates a communication terminal B. In a voice communication session, user A and user B talk to each other through their communication terminals A and B. The communication terminals A and B are coupled through a data link 103. The data link 103 may be implemented as a point-to-point connection or a communication network. At either side of user A and user B, VAD (Voice Activity Detection) is performed on audio blocks of the audio signal captured by the user's communication terminal. If voice presence is decided in an audio block, corresponding processing (e.g., applying a gain suitable for voice) is performed on the audio block and the audio block is transmitted to another user's communication terminal A through the data link 103. If no voice presence is decided in an audio block, corresponding processing (e.g., applying a gain suitable for non-voice) is performed on the audio block and the audio block is transmitted to another user's communication terminal A through the data link 103. In this case, it is also possible to transmit simple information indicating a silence period to the other user's communication terminal, or to indicate that the time period corresponding to this audio block is silent by transmitting nothing. The other user's communication terminal receives the transmitted audio blocks and stores them to entries corresponding to the same time as the audio blocks in its jitter buffer, to eliminate transmission jitters. Audio blocks in the jitter buffer are fed through decoding and processing to reproduce them at the output transducer or transducers of the communication terminal. Reception of the simple information or nothing may cause corresponding empty entries in the jitter buffer.

Figure 1B:
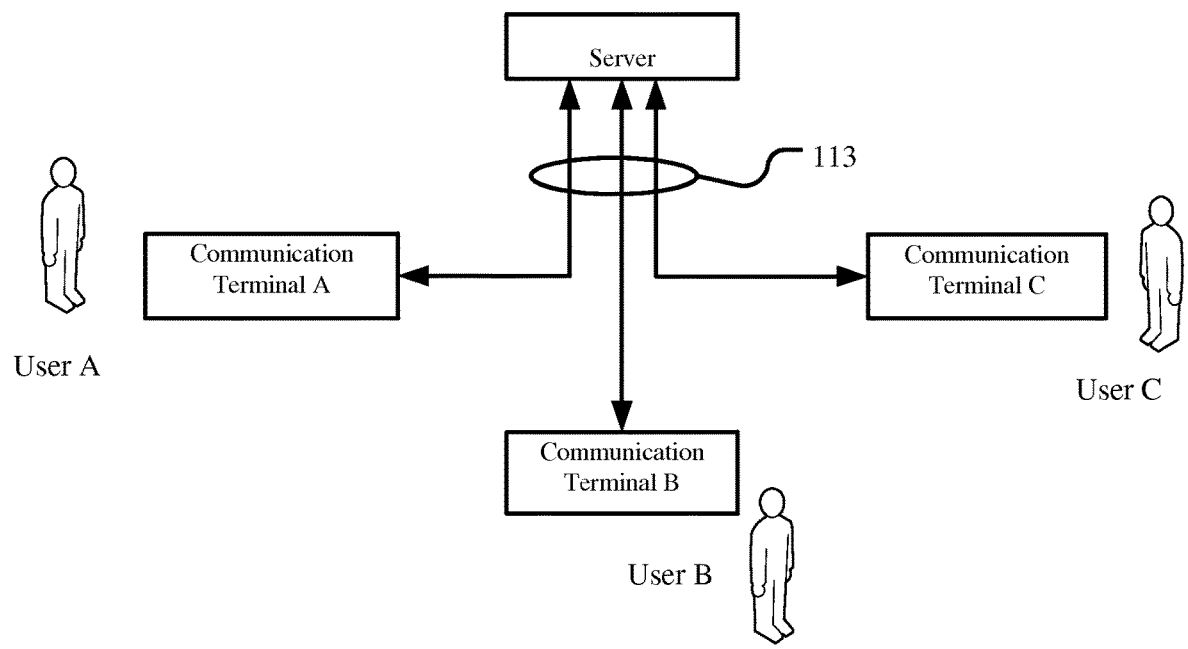
FIG. 1B is a diagram schematically illustrating another exemplary voice communication system where embodiments of the application can be applied.

FIG. 1B is a diagram schematically illustrating another example voice communication system where embodiments of the application can be applied. In this example, a voice conference may be conducted among users.

As illustrated in FIG. 1B, user A operates a communication terminal A, user B operates a communication terminal B, and user C operates a communication terminal C. In a voice conference session, user A, user B, and user C talk to each other through their communication terminals A, B, and C, respectively. The communication terminals illustrated in FIG. 1B have the same function as those illustrated in FIG. 1A. However, the communication terminals A, B, and C are coupled to a server through a common data link 113 or separate data links 113. The data link 113 may be implemented as a point-to-point connection or a communication network. At either side of user A, user B, and user C, VAD is performed on audio blocks of the audio signal captured by the user's communication terminal. If voice presence is decided in an audio block, corresponding processing (e.g., applying a gain suitable for voice) is performed on the audio block and the audio block is transmitted to the server through the data link 113. If no voice presence is decided in an audio block, corresponding processing (e.g., applying a gain suitable for non-voice) is performed on the audio block and the audio block is transmitted to the server through the data link 113. In this case, it is also possible to transmit simple information indicating a silence period to the server 115, or to indicate that the time period corresponding to this audio block is silent by transmitting nothing. The server receives the transmitted audio blocks and stores them to entries corresponding to the same time as the audio blocks in its jitter buffers associated with the users respectively, to eliminate transmission jitters. Audio blocks corresponding to the same time in the jitter buffers are mixed into one audio block and the mixed audio block is transmitted to all users A, B, and C. Reception of the simple information or nothing may cause corresponding empty entries in the jitter buffers. The users' communication terminals receive the audio blocks from the server and store them to entries corresponding to the same time as the audio blocks in their jitter buffers, to eliminate transmission jitters. In each communication terminal, audio blocks in the jitter buffer are fed to a voice processor to reproduce them through the speaker system of the communication terminal. Although three communication terminals are illustrated in FIG. 1B, there can reasonably be two or more communication terminals coupled in the system.

Estimation of Inter-Talkspurt Jitter (Offset)

Figure 2:
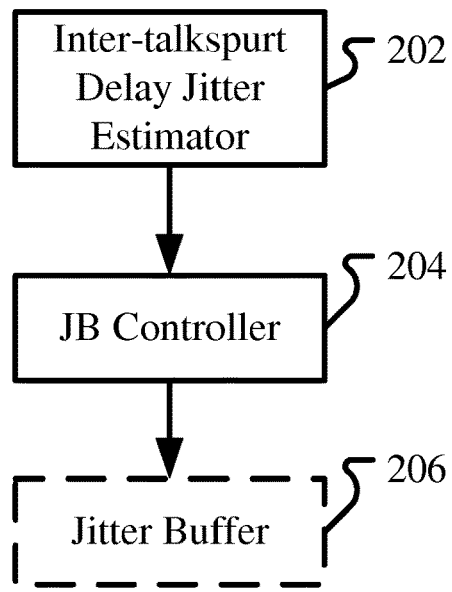
FIG. 2 is a diagram illustrating an apparatus for controlling a jitter buffer according to an embodiment of the application.

A first embodiment of the present application provides an apparatus 200 for controlling a jitter buffer 206 as shown in FIG. 2. The apparatus comprises an inter-talkspurt delay jitter estimator 202 for estimating an offset value of the delay of a first frame in the current talkspurt with respect to the delay of a latest anchor frame in a previous talkspurt, and a jitter buffer controller 204 for adjusting a length of the jitter buffer 206 based on a long term length of the jitter buffer 206 for each frame and the offset value.

According to the embodiment, the length (or size, or level) of the jitter buffer 206 may be adjusted based on the long term length of the jitter buffer (JB) 206 and the offset value (or jitter value) of the delay of the first frame in the current talkspurt. The long term length of the JB reflects a long term level of delay jitter in history audio signals, and the offset value of the delay of the first frame reflects the possible delay jitter of the current talkspurt. Thus the apparatus for controlling the JB according to the embodiment adjusts the length of the JB 206 based on both.

Please note that here the term "frame" is used. In the context of the present application, we assume "jitter buffer" is a "logical" jitter buffer storing audio frames. While depending on specific implementations, the physical jitter buffer may store any forms of packets or audio frames. Therefore, throughout the specification, the term "jitter buffer" shall be construed as including both jitter buffer actually storing audio frames and jitter buffer actually storing any forms of packets (blocks) which will be decoded into audio frames before being played out or being fed into any components where audio frames are necessary, and the decoding process will not be explicitly discussed in the present application although it does exist. Accordingly, the term "frame" shall be construed as including a real frame already decoded from a packet or still encoded in the packet, or a packet itself including one or more frames, or more than one frame encoded in a packet or already decoded from the packet. In other words, in the context of the present application, a processing involving a frame may also be construed as a processing involving a packet, or a processing involving simultaneously more than one frame contained in a packet.

The long term length of the JB is conventionally available for each frame. It may be estimated with a long term length estimator 802 (see FIG. 8) by computing a histogram of the past jitter values. Alternatively, the histogram can be replaced by a probability mass function (PMF) (see US patent application published as US20090003369A1). Once the histogram or PMF is calculated, the long term length can be estimated by setting a threshold such that the cumulative probability of the expected delay variation is less than this threshold.

The offset value of the delay of the first frame is calculated with respect to the latest anchor frame in the last talkspurt. Anchor frame is conventionally used as a reference for estimating a delay jitter of a newly received frame within the same talkspurt. In the present application, by using the latest anchor frame in the last talkspurt, a cross-talkspurt or an inter-talkspurt delay jitter (offset value) is estimated. And thus the length of the JB may be adjusted upon the start of a new talkspurt by referring to the last talkspurt.

Figure 4:
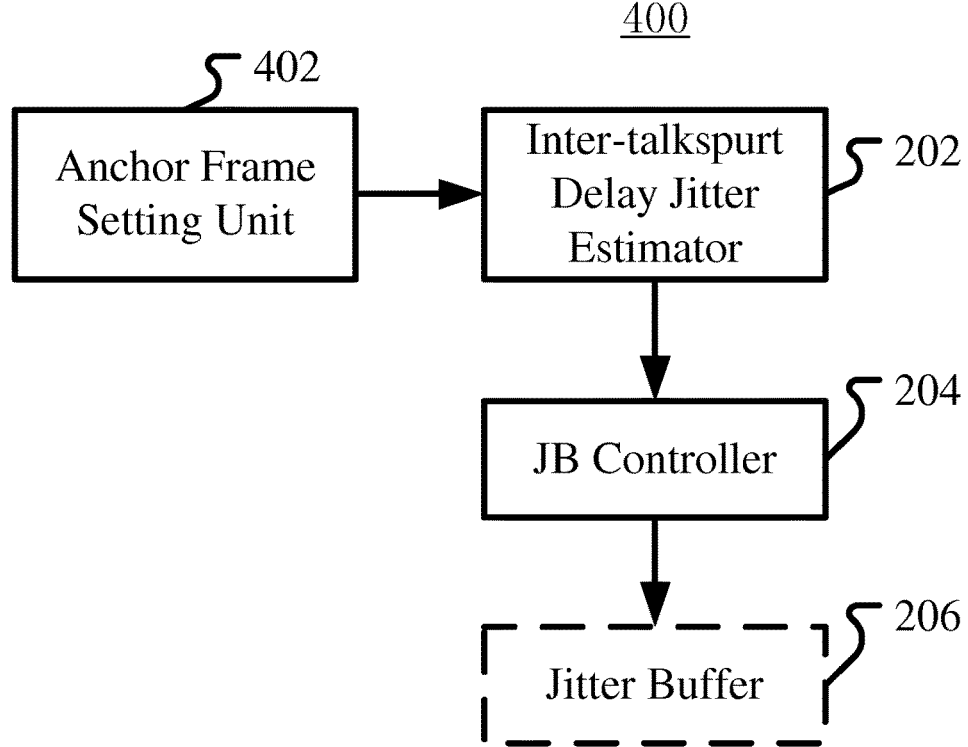
FIG. 4 is a diagram illustrating an apparatus for controlling a jitter buffer according to a variation of the embodiment as shown in FIG. 2.

The anchor frame in a talkspurt may be set with an anchor frame setting unit 402 (FIG. 4). Theoretically it is reasonable to use a frame with minimum one way delay as the anchor frame. However, it is difficult to measure an absolute one way delay, requiring both sender and receiver timing information and clock synchronization. Furthermore, storing many packets in order to get minimum delay is not practical in a real time system like VoIP, and using too old an anchor frame may be subject to numerical issues and clock drift. Therefore, it is proposed to use the first frame of the talkspurt as the anchor and then keep updating it, so that a "local" minimum delay within one talkspurt may be used. Another problem arising from setting the first frame as the anchor frame is that the first frame might be in a delay spike, which would not be detected if using the first frame as the anchor. This could lead to inaccurate delay distribution estimation and over-estimation of jitter buffer length. Keeping updating the anchor frame within the talkspurt mentioned above may partly mitigate the problem, and the problem may be further mitigated through the cross-talkspurt use of the latest anchor frame in the last talkspurt or more latest anchor frames in several previous talkspurts as will be discussed later. In this way, a local minimum delay within a longer time period may be found and used.

Therefore, according to a variation 400 of the first embodiment, the apparatus for controlling a jitter buffer may further comprise an anchor frame setting unit 402 for initially setting the first frame in the current talkspurt as the anchor frame, and setting a newly received frame as the anchor frame when a delay jitter of the newly received frame meets a predefined condition. The cross-talkspurt use of the latest anchor frame in the last talkspurt will be discussed later.

That is, the anchor frame may be updated in time and thus a timely-closer anchor frame may be used. For example, if the delay jitter of a new frame with respect to the present anchor frame is less than 0, that is, the new frame arrived earlier than expected, then the new frame may be used as new anchor frame. Or, for avoiding using too old an anchor frame, the new frame with zero delay jitter may also be used as the new anchor frame.

Figure 3:
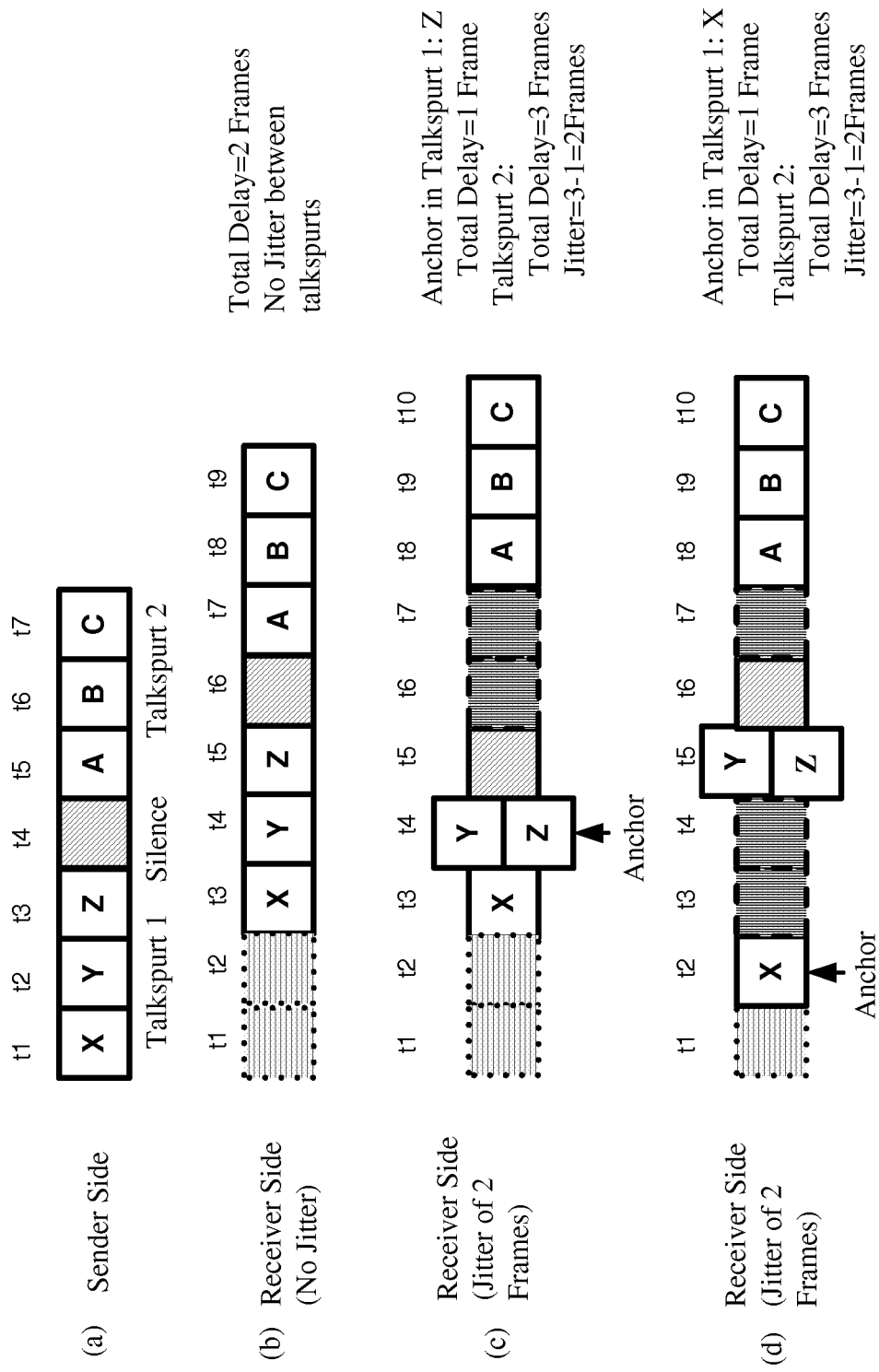
FIG. 3 is a diagram illustrating selection of an anchor frame and calculation of inter-talkspurt delay jitter.

For example, as shown in FIG. 3, there are two talkspurts 1 and 2 separated by a silence frame (shown as a block shadowed with slash lines). The frames X, Y, Z in Talkspurt 1 are sent at time t1, t2, t3 (FIG. 3(*a*)) and would be received on the receiver side at time t3, t4, t5 with an overall delay (total delay with respect to the sending time) of two frame gaps (t1 and t2), assuming $t_{i+1}-t_i$ is a frame gap of 20 ms and i is an integer (FIG. 3(*b*)). In FIG. 3(*b*), the first frame X would be set as the initial anchor frame. Because both frame Y and frame Z arrive in time as expected, the delay jitter thereof with respect to the anchor frame X is zero, X may be maintained as the anchor frame, or either frame Y or Z may be updated as new anchor frame (not shown in FIG. 3(*b*)).

In the situation shown in FIG. 3(*c*), frames X and Y arrive as expected based on the total delay but frame Z arrive 1 frame (frame gap) earlier than expected, taking frame X or Y as reference (anchor frame). Thus frame Z is updated as the anchor frame since the jitter value is less than 0 (−1 frame). Please note that in FIG. 3(*c*) and FIG. 3(*d*), frames Y and Z are shown as arriving at the same time (t4 or t5, respectively). In the context of the present application, the meaning of the expression "at the same time" includes but is not limited to the exact literal meaning, and shall be construed as "within the same time gap/interval of a predefined granularity". In the present application, for example, the predefined granularity may be the time gap between two consecutively-sent frames/packets (such time gap may be referred to as frame gap), or network probing rate for checking packet arrivals, or processing time granularity, but is not limited thereto. For the latter, e.g. we may quantize the arrival time by frame duration/gap, e.g. 20 ms. That is, we represent time in integer number of packets. Similarly, in the context of the present application, when involving a specific time point, depending on the context it may also mean a time gap of the predefined granularity. Further, when involving a specific time $t_i$ (i is integer) for a certain frame where it shall be understood as a time point, assuming for clarity that it indicates the time point when the frame starts on the sender side, or indicates the time point when the reception of the frame starts on the receiver side.

In the situation shown in FIG. 3(*d*), the first frame X is initially set as anchor frame, with respect to which both frames Y and Z are further delayed. The delay jitter of frame Y is 2 frames and that of frame Z is 1 frame, and thus frame X is maintained as anchor frame until talkspurt 1 completes because the jitter value is greater than 0.

Figure 5:
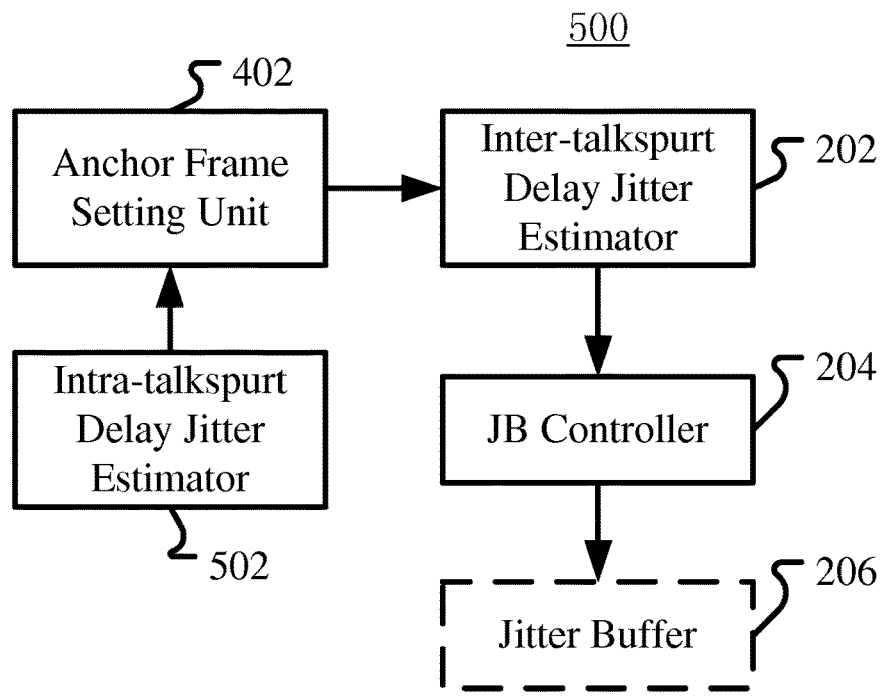
FIG. 5 is a diagram illustrating an apparatus for controlling a jitter buffer according to another variation of the embodiment as shown in FIG. 2.

Within the current talkspurt, the jitter value of a newly received frame with respect to the anchor frame may be estimated by an intra-talkspurt delay jitter estimator 502 (in variation 500 as shown in FIG. 5). The intra-talkspurt delay jitter estimator 502 is configured to calculate, as the delay jitter, a difference between an actual reception time of the newly received frame and an expected reception time of the same newly received frame, the expected reception time being calculated with the present anchor frame as a reference.

For example, still referring to FIG. 3(c) and assuming the receiving time of the first frame X (the initial anchor frame) in talkspurt 1 is t3=R(0), and the expected frame gap is G=20 ms, then the "expected" receiving time of the following frames Y and Z is R(0)+20 ms and R(0)+40 ms. While in fact both frames Y and Z are received at t4=R(0)+20 mses. Thus delay jitter is the difference between the actual time of receiving respective frames and the expected time of receiving the respective frames. That is, for frame Y, the delay jitter is R(0)+20−(R(0)+20)=0; and for frame Z, the delay jitter is R(0)+20−(R(0)+40)=−20 ms, meaning frame Z arrived 20 ms earlier. Here, the delay jitter is measured in unit of time. Since the time gap (frame gap) between two consecutive frames without delay jitter is fixed (such as 20 ms), the delay jitter (as well as delay) may also be measured in unit of frame. For example, we can say the delay jitter of frame Z is −1 frame, that is, frame Z arrives one frame earlier.

Within each talkspurt, the anchor frame will be constantly updated if the predefined condition is met. When each talkspurt finishes, there is a latest anchor frame, such as frame Z in FIG. 3(c) or frame X in FIG. 3(d) when talkspurt 1 finishes; and for the new talkspurt, there will be a new anchor frame, such as the first frame A in FIG. 3 when talkspurt 2 starts. In the present application, the offset value (jitter) of the delay of the first frame is calculated with respect to the latest anchor frame in the last talkspurt, thus the length of the JB may be adjusted upon the start of a new talkspurt by referring to the last talkspurt.

Figure 6:
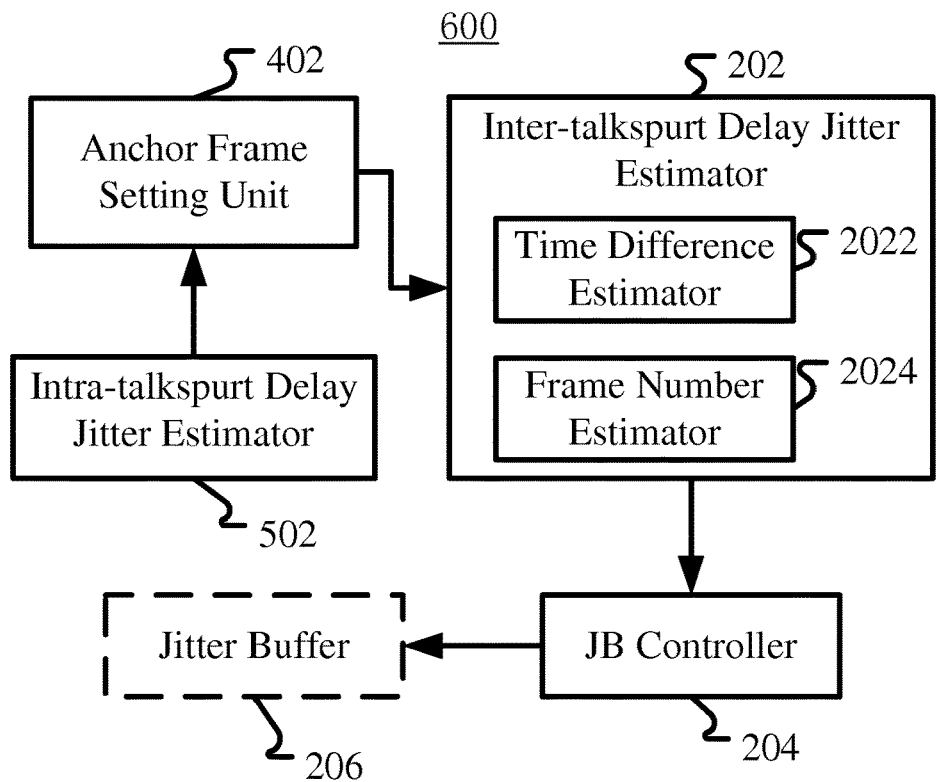
FIG. 6 is a diagram illustrating an apparatus for controlling a jitter buffer according to another variation of the embodiment as shown in FIG. 2.

In a variation 600 as shown in FIG. 6, the offset value of the delay of the first frame may be estimated in the inter-talkspurt delay jitter estimator 202 by means of a time difference estimator 2022 for calculating a time difference between the reception time of the latest anchor frame and the reception time of the first frame, and a frame number estimator 2024 for estimating an expected number of frames between the latest anchor frame and the first frame. Specifically, the offset value may be calculated based on the time difference and an expected time difference obtained based on the expected number of frames.

In the frame number estimator 2024, the expected number of frames may be determined based on sequence numbers of the latest anchor frame and the first frame and information regarding silence frames between the previous talkspurt and the current talkspurt, the information regarding silence frames being carried in at least one frame in at least one talkspurt in the previous talkspurt and the current talkspurt.

For example, in the DTX (Discontinuous Transmission) mode, no frames are transmitted during silence. The number of non-silence frames between two non-silence frames may be deduced from the sequence numbers of the two non-silence frames because non-silence frames are sequentially numbered regardless whether the two non-silence frames belong to the same talkspurt. For example, in FIG. 3, from frame X to frame C, the number of non-silence frames is C−X=6, meaning C is the fifth frame after frame X (here using X and C to represent the numbers of the two frames). However, the number of silence frames lapsed since the end of the last talkspurt cannot be deduced directly from RTP (Real-time Transport Protocol) sequence number of RTP packets/frames, because the RTP packet sequence number will not increment for silence packets/frames. For example, in FIG. 3, the sequence number of frame A directly follows the sequence number of frame Z, thus it is impossible to deduce from the sequence numbers of frames Z and A the number of silence frames between frames Z and A. Here, DTX mode and RTP format are just examples and the present application is not limited thereto.

Therefore, to calculate the expected number of frames between two frames in two talkspurts, the number of silence frames between the two talkspurts must be obtained. For indicating the information about silence frames, various means may be adopted. For example, timestamp information may be embedded in all the frames as that in the standard RTP frame format, or only embedded in the last frame of the previous talkspurt and the first frame of the current talkspurt. For example, in FIG. 3, timestamp information may be embedded in all frames, or only in frames Z and A. In either situation, the timestamp information in frames Z and A is enough for deducing the number of silence frames. Specifically, the timestamp embedded in frame Z will be its sending time t3, and the timestamp embedded in frame A will be its sending time t5. Then, the time interval between frames Z and A on the sending side will be t5−t3−20 ms=20 ms (assuming a frame gap is 20 ms), and it may be deduced that the number Nsil of silence frames is Nsil=20 ms/20 ms=1 frame. Another alternative is that the number of silence frames may be embedded in the first frame of the current talkspurt. For example, in FIG. 3, information indicating that there is one silence frame may be embedded in frame A, that is, Nsil=1 frame.

Therefore, in the present application, the information regarding silence frames may comprise the number of the silence frames, the number being embedded in the first frame of the current talkspurt. Or, the information regarding silence frames may comprise timestamps in the last frame of the previous talkspurt and the first frame in the current talkspurt.

Let Nsil denote the number of silence frames between the two adjacent talkspurts (in the example of FIG. 3, Nsil=1). Then for the first frame of the current talkspurt, the total expected number of lapsed frames since the last anchor frame is Ntotal=$S_j(0)-S_{j-1}(a)+Nsil$, where $S_j(0)$ is the sequence number of the first frame of the current talkspurt j (such as frame A in talkspurt 2 in FIG. 3), and $S_{j-1}(a)$ is the sequence number of the anchor frame of the previous talkspurt j−1 (such as frame Z in talkspurt 1 in FIG. 3(c) or frame X in talkspurt 1 in FIG. 3(d)). For example, in FIG. 3(c), Ntotal=A−Z+Nsil=1+1=2 frames, meaning A is the second frame after the anchor frame Z if taking the silence frame(s) into account. In FIG. 3(d), Ntotal=A−X+Nsil=3+1=4 frames, meaning A is the fourth frame after the anchor frame X if taking the silence frame(s) into account.

Let G (such as 20 ms) be the expected time gap (frame gap) between consecutive frames without jitter, then the expected reception time difference between the latest anchor frame of the last talkspurt and the first frame of the current talkspurt will be Ntotal*G. Then the delay jitter of the first frame in the current talkspurt with respect to the latest anchor frame in the last talkspurt, that is the inter-talkspurt delay jitter, will be $D_j(0)=R_j(0)-R_{j-1}(a)-Ntotal*G$, where $R_j(0)$ is the receiving time of the first frame in the current talkspurt j and $R_{j-1}(a)$ is the receiving time of the latest anchor frame of the last talkspurt j−1. In FIG. 3, assuming each $t_i$ (i is an integer) represents a time gap of 20 ms, then in FIG. 3(c) $D_j(0)=R_j(0)-R_{j-1}(a)-Ntotal*G=t8-t4-2*20=80-40=40$ ms; and in FIG. 3(d) $D_j(0)=R_j(0)-R_{j-1}(a)-Ntotal*G=t8-t2-4*20=120-80=40$ ms.

The delay jitter so calculated is measured in unit of time. For purpose of controlling the size (length) of the jitter buffer, which is measured in unit of frame, the delay jitter $D_j(0)$ may be converted into $d_j(0)$ measured in unit of frame by a division with the time gap (frame gap) G: $d_j(0)=\lfloor D_j(0)/G \rfloor$, where the operation $\lfloor x \rfloor$ denotes the function of mapping a real number x to the largest previous integer, that is, floor(x)=$\lfloor x \rfloor$ is the largest integer not greater than x. But the operation may also be rounding or ceiling (ceiling(x)=$\lceil x \rceil$ is the smallest integer not less than x). For example, in both FIG. 3(c) and FIG. 3(d) the delay jitter is $d_j(0)$=40/20=2 frames. The following table shows the calculating process discussed above for FIG. 3(c) and FIG. 3(d), as well as FIG. 3(b):

|  | Physical meaning of symbols | FIG. 3(b) | FIG. 3(c) | FIG. 3(d) |
|---|---|---|---|---|
| $R_j(0)$ | reception time of 1st frame A in talkspurt 2 | t7 | t8 | t8 |
| $R_{j-1}(a)$ | reception time of the latest anchor frame in talkspurt 1 | t5 (Z) | t4 (Z) | t2 (X) |
| Dr | =$R_j(0) - R_{j-1}(a)$, real reception time difference | t7 − t5 = 40 ms | t8 − t4 = 80 ms | t8 − t2 = 120 ms |
| $S_j(0)$ | sequence number of 1st frame A in talkspurt 2 | A | A | A |
| $S_{j-1}(a)$ | sequence number of the latest anchor frame in talkspurt 1 | Z | Z | X |
| $S_j(0) - S_{j-1}(a)$ | number of non-silence frames | 1 | 1 | 3 |
| Nsil | number of silence frames | 1 | 1 | 1 |
| Ntotal | =$S_j(0) - S_{j-1}(a)$ + Nsil, total number of frames | 2 | 2 | 4 |
| Ntotal*G | expected reception time difference | 2*20 = 40 ms | 2*20 = 40 ms | 2*40 = 80 ms |
| $D_j(0)$ | delay jitter in unit of time | 0 | 40 ms | 40 ms |
| $d_j(0)$ | =$D_j(0)/G$, delay jitter in unit of frame | 0 | 2 | 2 |

Please note that in the example shown in FIG. 3, for clarity of description, all the delays and jitters are shown as times gaps which are integer multiple times of the normal frame gap, thus the calculated delay jitters $D_j(0)$ in unit of time are just integer multiple times of the frame gap (such as 20 ms). But the present application is not limited thereto, and the real time difference between any two frames may not be integer multiple times of the normal frame gap. In addition, it may be noticed that in FIG. 3, for facilitating understanding, absolute delay values are marked; but just as shown in the calculating process discussed above, such values are unnecessary for the present invention and we just care the relative delay (that is jitter) values with respect to the anchor frame.

In the first embodiment and its variations discussed above, when estimating the inter-talkspurt delay jitter, that is the offset value of the delay of the first frame of the current talkspurt, the latest anchor frame in the last talkspurt is used. The last talkspurt is a previous talkspurt immediately previous to the current talkspurt.

Alternatively, the offset value may be estimated with respect to a previous talkspurt not immediately adjacent to the current talkspurt, and by referring to the description hereinbefore it is easy to anticipate how to estimate the offset value.

Figure 7:
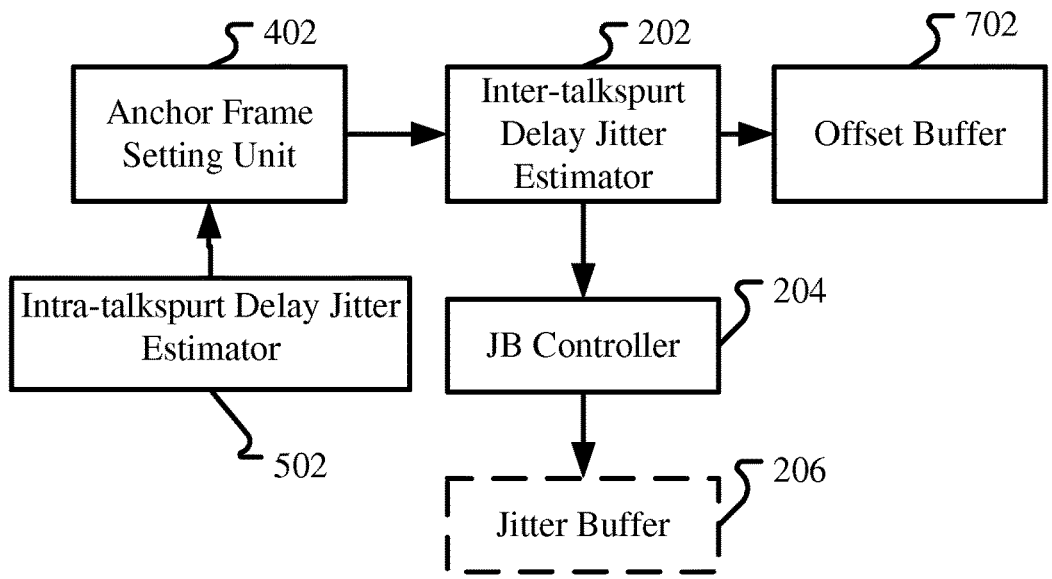
FIG. 7 is a diagram illustrating an apparatus for controlling a jitter buffer according to yet another variation of the embodiment as shown in FIG. 2.

Again alternatively, in a variation 700 as shown in FIG. 7, the apparatus for controlling a jitter buffer may further comprise an offset buffer 702 for storing at least one earlier offset value of at least one first frame in at least one earlier talkspurt, and the inter-talkspurt delay jitter estimator 202 may be configured to adjust the offset value of the delay of the first frame in the current talkspurt based on an average or weighted average of the at least one earlier offset value, or adopt the largest offset value among the present offset value and the at least one earlier offset value.

The benefit of using a previous talkspurt not immediately adjacent to the present talkspurt or more than one previous talkspurts is to get a more reliable estimate of the offset. The immediate previous talkspurt might be very short, which makes the anchor less accurate. Therefore it would make sense to use an earlier and more reliable talkspurt, or several previous talkspurts to find the talkspurt with minimum delay (the corresponding offset would be the maximum).

However, if we always use the minimum anchor, eventually we may be able to find out the absolute minimum anchor throughout the whole conversation session. But this may not be a good solution as we may likely have a large offset value, and fail to address the clock drift problem (resetting a new reference anchor frame for inter-talkspurt delay jitter estimation would implicitly address the clock drift problem). So we may just use a limited number of previous talkspurts. The number may be limited with a predefined threshold, or by a predefined time period. For example, it may be stipulated that only those talkspurts within last 30 seconds may be considered.

Estimation of and Adjustment to Long Term Length and Instant Length of Jitter Buffer In the first embodiment discussed hereinbefore, the instant length of the jitter buffer (JB length) may be adjusted based on the long term length of the jitter buffer and the offset value as determined in the first embodiment. Such adjustment may be implemented in any proper way in so far as both the long term length and the offset value are considered. For example, as shown in the second embodiment 800 illustrated in FIG. 8, the JB length may be firstly determined based on the long term length from a long term length estimator 802 (e.g. JB length=a*long term length, where a is a coefficient), then adjusted with the offset value from the inter-talkspurt delay jitter estimator 202.

The long term length $B_j(n)$ of the jitter buffer for frame n in talkspurt j can be estimated by computing a statistical distribution of history delay jitter values, such as a histogram of the past jitter values. By making use of the histogram, a delay jitter threshold may be selected so that the cumulative probability of the delay jitter values lower than the delay jitter threshold meets the requirement in practice. For example, if a voice communication application requires the frame loss rate shall be lower than 5%, then we can set the delay jitter threshold so that the cumulative probability of the delay jitter values lower than the delay jitter threshold is equal or greater than 95%. If the jitter buffer length is set to be equal to the so-determined threshold, then the frame loss rate will be equal to or lower than 5% (although in the present application, the long term length is not necessarily directly adopted as the instant jitter buffer length). Alternatively, the histogram can be replaced by a probability mass function (PMF) (see US patent application published as US20090003369A1).

Note that since the long term length is determined based on jitter values in the history, the history data will be updated only when a new frame is received. Therefore, the estimation of the long term length of the long term length estimator 802 will be triggered only when a new frame is received. At a particular time, we may or may not receive a frame to update the long term length. Therefore, in the symbol of the long term length $B_j(n)$, we ignore the time index t.

Figure 9:
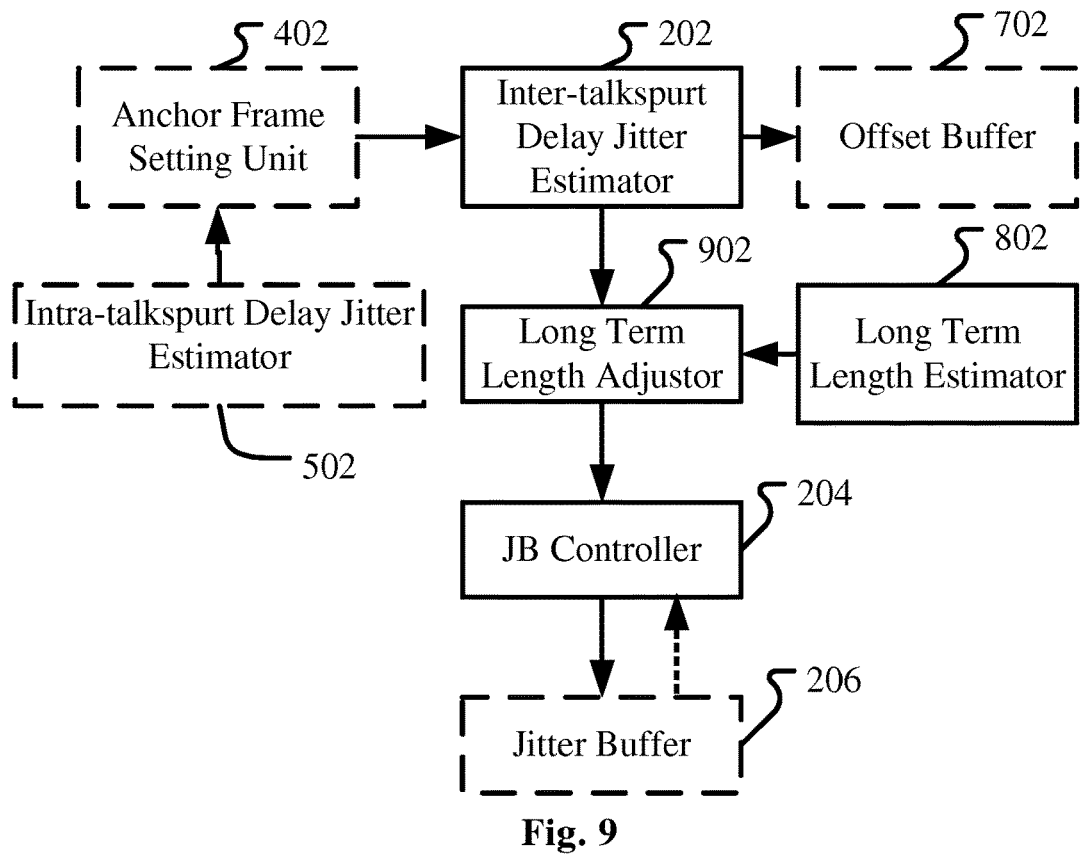
FIG. 9 is a diagram illustrating an apparatus for controlling a jitter buffer according to a variation of the embodiment as shown in FIG. 8.

In a variation 900 of the second embodiment, as shown in FIG. 9, the long term length $B_j(n)$ may be firstly adjusted by a long term length adjustor 902 with the offset value $d_j(0)$ discussed in the first embodiment. The basic idea of the adjustment is properly decreasing the long term length if the offset value is greater than 0.

The decrease of the long term length may be realized in any way. As an example, the following formula or any variation thereof may be adopted:

$$B'_j(n) = \left\lfloor \frac{B_j(n) + \max(0, B_j(n) - d_j(0))}{2} \right\rfloor \quad (1)$$

where $B'_j(n)$ is an adjusted version of the long term length $B_j(n)$, and $d_j(0)$ should be not less than 0. The operation $\lfloor x \rfloor$ has the same meaning as in the first embodiment, and may be replaced with rounding function or ceiling function.

If the offset is greater than the long term length, it means the jitter has exhausted the long term length, and the packet should be played out immediately. While in the present application, according to the formula (1), we still give the packet a smaller buffer length ($B_j(n)/2$) to avoid possible packet loss. Here, the denominator "2" is just an example and it may be any other value greater than 1.

When $d_j(0)$ is less than $B_j(n)$, it means the long term length has been partly "used" by the offset of the first packet of the new talkspurt, and the adjusted long term length may be larger than the former case.

In another variation, the long term length adjustor 902 may be configured to fade the offset value with time. That is, $d_j(0)$ calculated in the first embodiment may just serve as an initial offset used in the formula (1), and with the increasing of the index n (as well as lapse of time), that is, every time a new frame is received, the value of $d_j(0)$ may be decreased, thus the effect of $d_j(0)$ upon the long term length may be faded with time.

In yet another variation, it is proposed to discard the effect of previous talkspurt(s) if the transmission quality for the previous talkspurt(s) is too bad. That is, if the long term length at the end of the last talkspurt is greater than a predefined threshold, for the new talkspurt, the long term length estimator may reset the long term length to a predefined initial value, and reset the history delay jitter values. That is, the history jitter values up to the last talkspurt will be discarded and the history jitter values will be re-accumulated from the start of the new talkspurt. In this way, we can reset the long term length (and thus the length of the jitter buffer) to a normal level, since the last talkspurt probably is an abnormal one.

Figure 8:
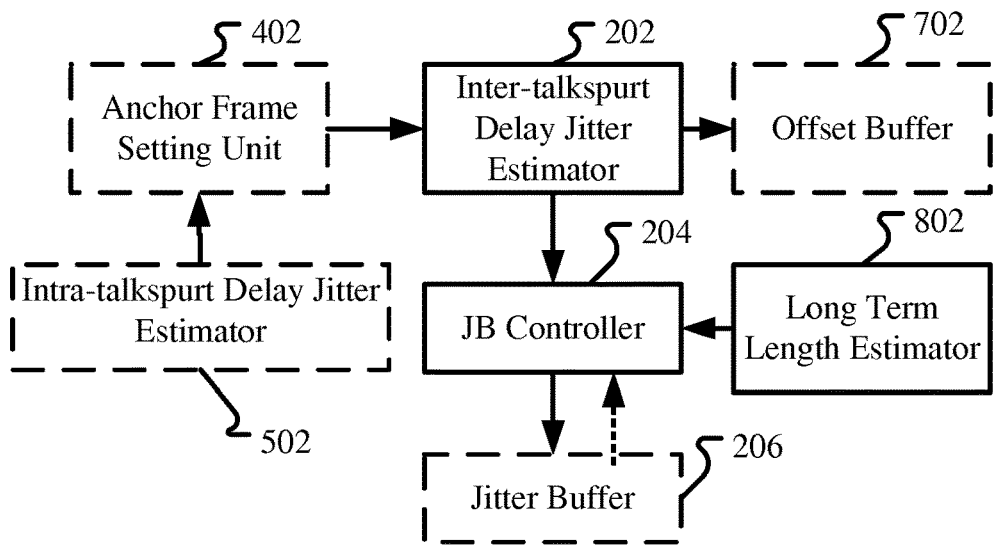
FIG. 8 is a diagram illustrating an apparatus for controlling a jitter buffer according to another embodiment of the application.

Please note that the solution of the second embodiment may be based on the first embodiment, but it can also be a solution independent from the first embodiment. Therefore, as shown in FIG. 8 and FIG. 9, those components shown in dash lines may be omitted.

Further Adjustment to Initial Length of Jitter Buffer for New Talkspurt

In the first and second embodiments discussed hereinbefore, the jitter buffer length may be adjusted via adjustment to the long term length of the jitter buffer. A simple way is directly using the long term length as the instant length of the jitter buffer for each frame.

In a third embodiment, a more specific adjustment to the jitter buffer length, or strictly speaking, the initial length of the jitter buffer for a new talkspurt, is introduced.

The third embodiment is also shown in FIG. 8 and FIG. 9, especially by the dashed line arrow directing from the jitter buffer 206 to the JB controller 204. Specifically, the jitter buffer controller 204 may be configured to set the length of the jitter buffer 206 for the first frame of the current talkspurt based on the long term length for the first frame and the number of frames received at the same time with the first frame. For example, the following formula or any variation thereof may be used:

$$L_j(t0) = B'_j(n0) + N(t0) + C \quad (2)$$

where $L_j(t0)$ is the instant length of the jitter buffer at the time t0 of the first frame n0 in the current talkspurt, $B'_j(n0)$ is the adjusted long term length for the first frame n0, $N(t0)$ is the number of frames received at t0, that is, at the same time as the first frame n0, and C is a predefined constant integer. Here, the expression "at the same time" shall be construed as mentioned before. That is, $N(t0)$ actually is the number of frames received in the same time gap as the first frame n0. Here $N(t0)$ may or may not take the first frame itself into account, and the difference so introduced may be compensated by the constant C.

In the formula an adjusted version $B'_j(n0)$ of the long term length is used. That is, the third embodiment is based on the first and/or second embodiment. In a fourth embodiment independent from the first and/or second embodiment, the formula (2) may be rewritten as:

$$L_j(t0) = B_j(n0) + N(t0) + C \quad (2')$$

where $B_j(n0)$ is the long term length for the first frame n0, but without the adjustment with the offset value $d_j(0)$.

As discussed in the previous embodiments and their variations, focus is on reset of long term length and/or initial length of the jitter buffer for the first frame of the current talkspurt. As the result of the reset (probably as well as the improvement of the network condition), such a scenario may occur where the frames of the last talkspurt have not been played out completely when some frames of the new talkspurt have come. At that time, if the long term JB length (adjusted or not adjusted) for the first frame of the current talkspurt is longer than the number of the not-yet-played out frames of the last talkspurt, since the first frame of the current talkspurt must wait for a period of time corresponding to the long term length, during which the frames of the last talkspurt will have been played out completely. However, if the number of not-yet-played out frames of the last talkspurt (that is the jitter buffer length still used by the last talkspurt) is greater than the long term length for the first frame of the current talkspurt, it means not all of those frames of the last talkspurt can be played out if the first frame of the current talkspurt must be played out in time based on the long term length for the first frame. Therefore, in a variation of the third/fourth embodiment, the jitter buffer controller 204 may be configured to, if the jitter buffer length still used by the last talkspurt is greater than the long term length and the first frame of the new talkspurt has arrived, drop some of the frames of the last talkspurt so that the frames of the last talkspurt occupy only the long term length of the jitter buffer.

Figure 10:
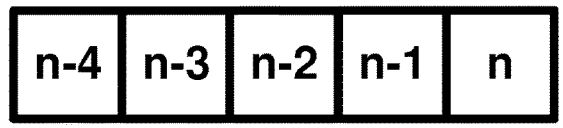
FIG. 10 is a diagram illustrating another embodiment of the application.
Figure 10:
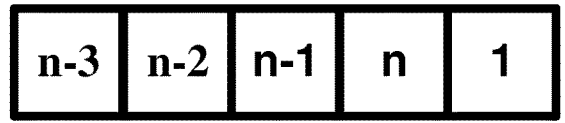
Figure 10:
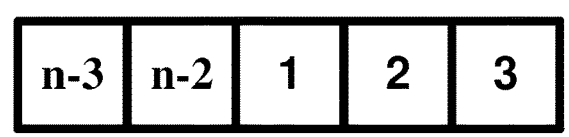

For example, as shown in FIG. 10, at the time t1, there are still 5 frames (n–4 to n) of the last talkspurt in the jitter buffer, that is, the JB length is 5 frames. Then at the next time t2, 3 frames (1 to 3, including the first frame 1) of a new talkspurt arrive and the estimated (and possibly adjusted) long term length of the jitter buffer for the first frame is 2. That means the long term length (2) for the first frame 1 plus the number (3) of the arrived frames of the new talkspurt will occupy a JB length of 5 frames. If without dropping some frames of the last talkspurt, then the first frame 1 of the current talkspurt must wait for 4 frames (n–3 to n, and the frame n–4 has been played out), which deviate from the long term length of 2 frames too much. Therefore, 2 frames of the last talkspurt must be dropped to let the first frame of the current talkspurt be played out timely. In the example as shown in FIG. 10, frames n–1 and n are dropped, that is, the last frames are dropped. However, other dropping scheme may be adopted, which will be discussed later.

Intra-Talkspurt Adaptation of Jitter Buffer Length

According to a fifth embodiment of the present application, the instant length of the jitter buffer may be adaptively changed from frame to frame. As a long term goal, the jitter buffer controller 204 may be further configured to adjust the present length of the jitter buffer toward the long term length. Such adjustment may be implemented by calculating a weighted average of the long term length and the present length. The following formula or any variation thereof is an example:

$$L_{f,j}(n) = L_{a,j}(n) + \alpha(B'_j(n) - L_{a,j}(n)) \quad (3)$$

where $B'_j(n)$ is the long term length of the jitter buffer for the current frame n in talkspurt j, which has been adjusted with the offset value as described in previous embodiments and their variants, $L_{a,j}(n)$ is the actual jitter buffer length for the current frame n, and $L_{f,j}(n)$ is the final jitter buffer length for the current frame n, and $\alpha$ is the weight, which may be regarded as a time constant controlling how much smoothing is applied.

In the above embodiment, the index n is used because the operation is executed from frame to frame. In a variation of the embodiment, the operation may also be executed at regular time interval, usually the playout tick, rather than on a per-received-frame basis. Therefore, the formula (3) may be rewritten as:

$$L_{f,j}(t) = L_{a,j}(t) + \alpha(B'_j(n) - L_{a,j}(t)) \quad (3')$$

where $B'_j(n)$ is the long term length of the jitter buffer for the current frame n in talkspurt j, which has been adjusted with the offset value as described in previous embodiments and their variants, $L_{a,j}(t)$ is the actual jitter buffer length for the current time t, and $L_{f,j}(t)$ is the final jitter buffer length for the current time t, and $\alpha$ is the weight, which may be regarded as a time constant controlling how much smoothing is applied. Note that the index n is still used in the term $B'_j(n)$ because $B'_j(n)$ is updated on a frame-basis as discussed hereinbefore. Also please note that in formula (3') the current time t does not necessarily correspond to the current frame n in a one-to-one manner, because the time t is always ticking forward while the index n will not necessarily increase so smoothly due to the delay jitter of frames.

In another variation, we can adopt different adaptation rate depending on whether the instant buffer length is greater or smaller than the long term estimate. And the jitter buffer controller may be configured so that the weight of the long term length is greater when the long term length is greater than the present length, and is smaller when the long term length is smaller than the present length.

In the fifth embodiment and its variations discussed above, $B'_j(n)$ is used. However, $B_j(n)$ may be used instead. Furthermore, the initial value of $L_{a,j}(t)$ in the current talkspurt, that is $L_{a,j}(t0)$, may or may not adopt the value $L_j(t0)$ discussed in the third/fourth embodiment and their variants. That is to say, the fifth embodiment and its variations may be combined together with the other embodiments and their variations discussed in this application, and may also be independent therefrom.

Pre-Emptive Expansion of Jitter Buffer

Jitter is the delay fluctuation of the arrived frames. The embodiments and variations discussed hereinbefore predict the jitter buffer length based on jitters of past frames. When there is a large jitter, the buffer algorithm cannot be updated appropriately since the instantaneous jitter is not yet seen by the buffer algorithm. Without adjusting the JB length, a large jitter will cause a large amount of frame losses.

Figure 11:
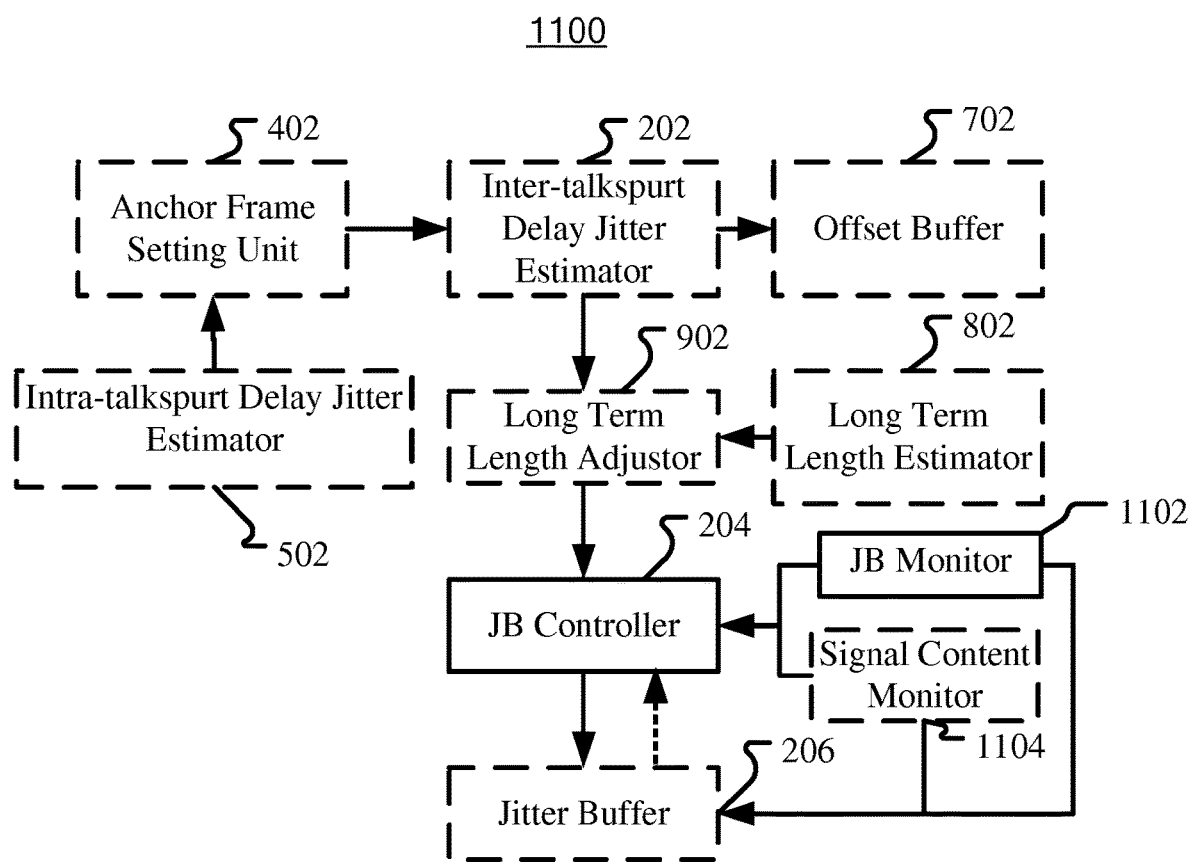
FIG. 11 is a diagram illustrating an apparatus for controlling a jitter buffer according to yet another embodiment of the application.

So, in a sixth embodiment shown in FIG. 11, it is proposed to perform pre-emptive buffer expansion based on monitoring the "future" of the jitter buffer. Specifically, the apparatus 1100 for controlling a jitter buffer 206 may comprise a jitter buffer monitor 1102 for monitoring occupancy of the jitter buffer 206, and wherein the jitter buffer controller 204 is further configured to increase the length of the jitter buffer 206 in response to the occupancy meeting a predefined condition.

The idea is before the buffer getting completely dry/empty, we pre-emptively increase jitter buffer length by inserting frames.

One embodiment is to check the occurrence number of consecutive single frame buffer occupancy. For example when there are two consecutive single-frame buffer occupancies, it may indicate that a rise of jitter may have occurred and the current buffer length is not long enough to meet the requirement. Therefore an extra one frame delay may be added to the current buffer length.

To be generalized, the jitter buffer controller 204 may be configured to increase the length of the jitter buffer 206 where an occupancy less than a predetermined threshold has consecutively occurred for a predetermined times.

Since pre-emptive expansion occurs when there are still frames available in the buffer, it provides the benefit of using frame interpolation instead of single-side frame extrapolation as in conventional approaches. It is known to those skilled in the art that frame interpolation can often produce better result than frame extrapolation. Pre-emptive expansion also helps spread the signal process which often causes distortion in the output.

The jitter buffer length cannot be increased too fast and/or unlimitedly. In a variation, the jitter buffer controller 204 may be configured to increase the length of the jitter buffer by one frame each time the condition is met. In another variation, the apparatus for controlling a jitter buffer may further comprise a signal content monitor 1104 for monitoring the content of the audio signal, and wherein the jitter buffer controller 204 is configured not to increase the length of the jitter buffer where the content of the audio signal is not appropriate for frame insertion.

A specific example is transient signal area. Frame insertion at the transient signal area often generates artifacts. Therefore, the signal content monitor 1104 may be configured to monitor the transient state of the audio signal, and the jitter buffer controller 204 may be configured not to increase the length of the jitter buffer in transient signal area.

Furthermore, the current jitter buffer length cannot be too long. In a variation, the jitter buffer controller may be configured to not increase the length of the jitter buffer where the present jitter buffer length exceeds a predetermined threshold.

Figure 12:
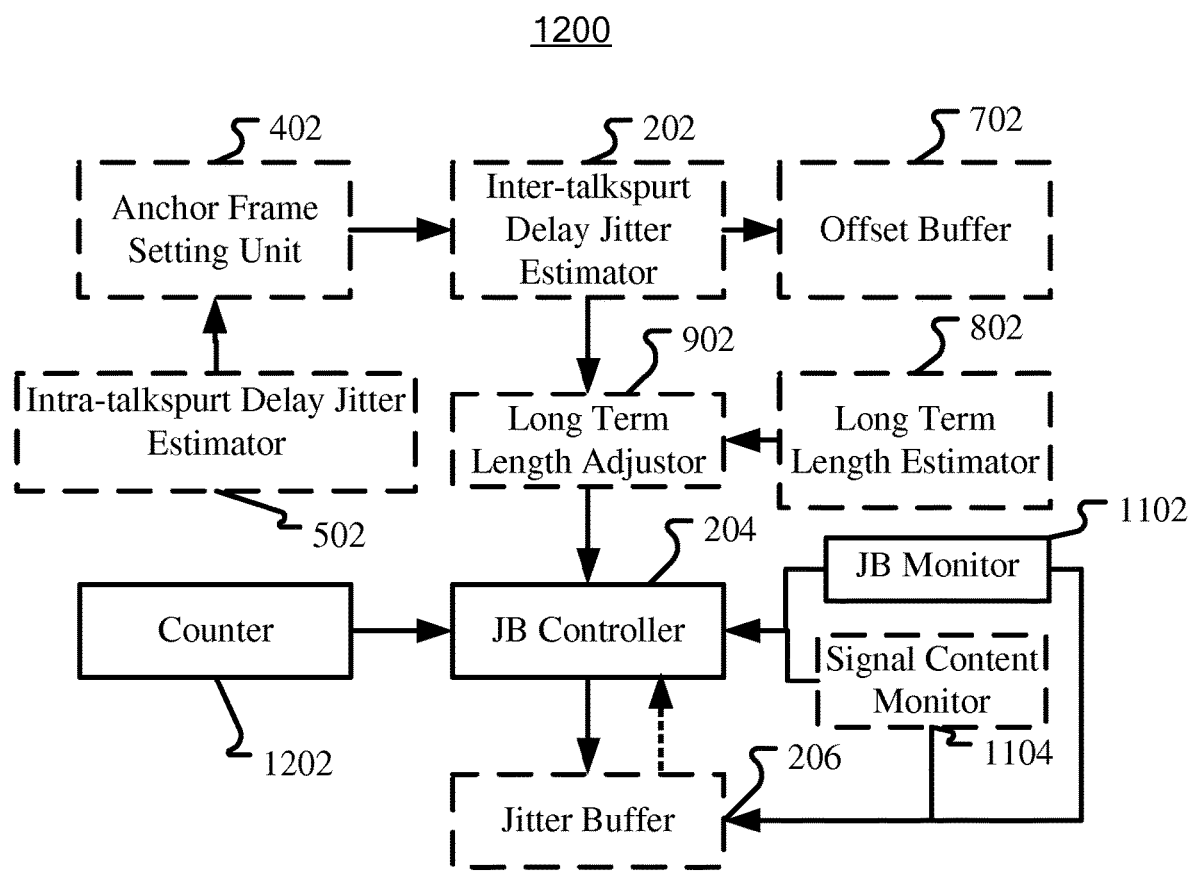
FIG. 12 is a diagram illustrating an apparatus for controlling a jitter buffer according to a variation of the embodiment as shown in FIG. 11.

Past signal processing frequency may also be referred to, i.e. we may stop frame insertion if this has been done a few times already. Therefore, in a variation 1200 as shown in FIG. 12, the apparatus for controlling a jitter buffer may further comprise a counter 1202 for counting frame insertions within the present talkspurt, wherein the jitter buffer controller 204 may be configured to not increase the length of the jitter buffer where the number of frame insertions within the present talkspurt exceeds a predetermined threshold.

Note that similar to other embodiments, the sixth embodiment and its variations may be implemented on the basis of any one or more of the other embodiments discussed hereinbefore, or may be implemented independent from the other embodiments. Just as shown in FIG. 11 and FIG. 12, all the components shown in dashed lines may be omitted or may be combined with the present embodiment in any combination.

Buffer Operation

In the previous embodiment and their variations, the instant jitter buffer length may be increased or shrunk in various situations. When the target jitter buffer length (the calculated jitter buffer length) equals to the present actual buffer length, the head frame of the jitter buffer is pushed out and played. In some other situations, for example where a pre-emptive expansion command has been issued, or if the target jitter buffer length is greater than the actual buffer length, then an expansion is performed. On the other hand, if the target jitter buffer length is smaller than the actual buffer length, a buffer shrink is performed.

Increase of the jitter buffer length may be realized through frame interpolation when a frame is available in the jitter buffer, or frame extrapolation when no frames are available in the jitter buffer. Frame interpolation means adding a frame before an available frame in the jitter buffer. The added frame may be an empty frame, a synthesized frame or a duplicate of the present playout frame or a future (not yet played out) frame in the jitter buffer. Frame extrapolation means adding a frame at the end of the jitter buffer. When there is no available frame in the jitter buffer, it means the added frame is after the latest playout frame. Similar to interpolation, an extrapolated frame may also be an empty frame, a synthesized frame or a duplicate of the latest playout frame.

Decrease of the jitter buffer length may be realized through dropping frames in the jitter buffer. The dropped frame may be at the head or end of the jitter buffer, or in the middle of the jitter buffer. When considering the position of frames in a talkspurt, generally we would drop ending frames in the jitter buffer when the talkspurt is coming to an end. When it is in the middle of a talkspurt, then we may drop earlier frames in the jitter buffer.

For avoiding possible artifacts originating from consecutive frames dropping, the jitter buffer controller may be configured to decrease the jitter buffer length through interleaved removal of frames in the jitter buffer. The removed frames may be selected randomly or according to predetermined pattern, such as removing one frame from every two or three frames.

Or, the apparatus for controlling the jitter buffer may further comprise a frame evaluator for evaluating the importance of frames in the jitter buffer, wherein the jitter buffer controller is configured to decrease the jitter buffer length by dropping those least important frames. The importance of the frame may be evaluated based on signal energy or spectral flux of frames, those frames with relatively low signal energy or low spectral flux being determined as relatively less important frames.

Another factor that may be used as the standard for dropping frames is periodicity. If the signal is highly periodic, it will make time scaling (expansion or compression) less prone to artifacts. Therefore, those segments of an audio signal that are highly periodic may be subject to interleaved removal; while the other segments may be subject to other form of frame dropping if necessary, such as dropping frames of lower energy.

Combination of Embodiments and Application Scenarios

All the embodiments and variants there of discussed above may be implemented in any combination thereof, and any components mentioned in different parts/embodiments but having the same or similar functions may be implemented as the same or separate components.

Specifically, when describing the embodiments and their variations hereinbefore, those components having reference signs similar to those already described in previous embodiments or variants are omitted, and just different components are described. In fact, these different components can either be combined with the components of other embodiments or variants, or constitute separate solutions alone. For example, there may be the following separate solutions: (1) using inter-talkspurt delay jitter (offset value) to adjust jitter buffer length (FIG. 2); (2) setting anchor frame (FIG. 4); (3) estimating intra-talkspurt delay jitter and updating anchor frame (FIG. 3, FIG. 5); (4) estimating inter-talkspurt delay jitter (offset value) (FIG. 6); (5) using multiple offset values to adjust the jitter buffer length (FIG. 7); (6) estimating long term jitter buffer length (FIG. 8); (7) determining the jitter buffer length based on long term jitter buffer length and the offset value (FIG. 8); (8) setting and adapting instant jitter buffer length based on the long term jitter buffer length and first received frames (FIG. 10); (9) adjusting the long term jitter buffer length with the offset value (FIG. 9); (10) intra-talkspurt adaption of the jitter buffer length toward the long term jitter buffer length; (11) pre-emptive expansion of the jitter buffer; and (12) expansion/increase and shrinking/decrease of the jitter buffer. And, any two or more of the above separate solutions may be combined together to form new solutions.

Figure 13:
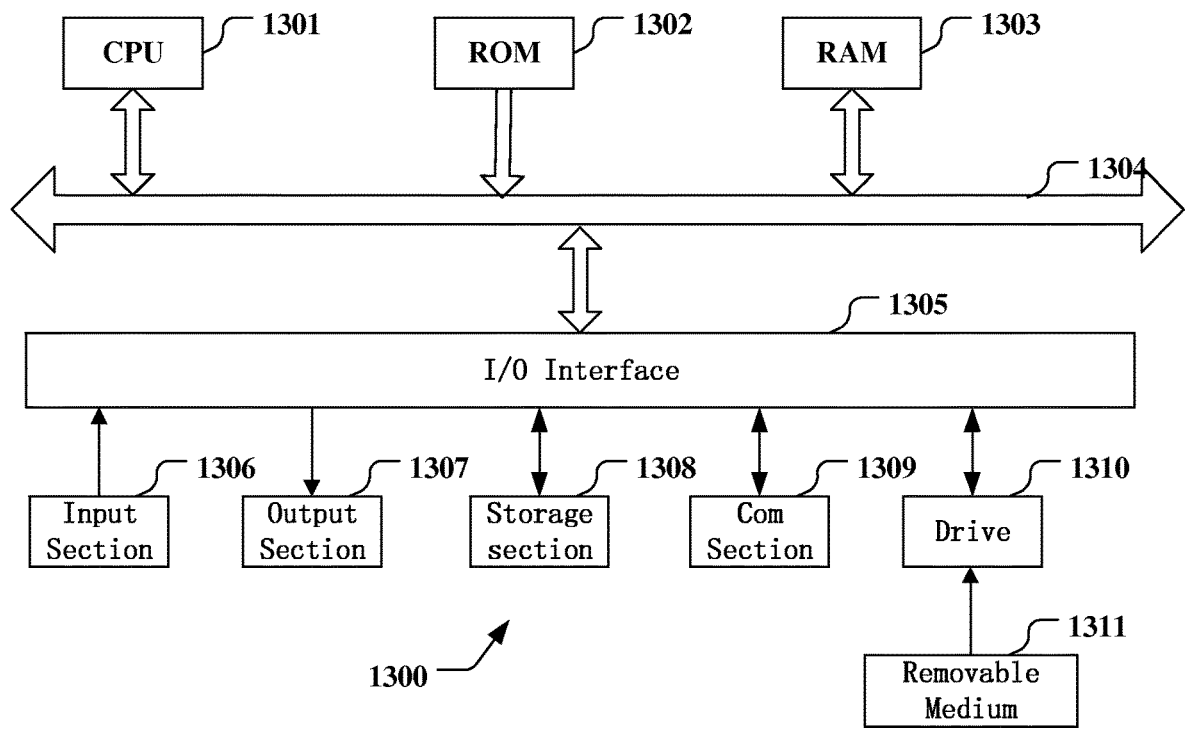
FIG. 13 is a block diagram illustrating an exemplary system for implementing embodiments of the present application.

As discussed at the beginning of the Detailed Description of the present application, the embodiment of the application may be embodied either in hardware or in software, or in both. FIG. 13 is a block diagram illustrating an exemplary system for implementing the aspects of the present application.

In FIG. 13, a central processing unit (CPU) 1301 performs various processes in accordance with a program stored in a read only memory (ROM) 1302 or a program loaded from a storage section 1308 to a random access memory (RAM) 1303. In the RAM 1303, data required when the CPU 1301 performs the various processes or the like are also stored as required.

The CPU 1301, the ROM 1302 and the RAM 1303 are connected to one another via a bus 1304. An input/output interface 1305 is also connected to the bus 1304.

The following components are connected to the input/output interface 1305: an input section 1306 including a keyboard, a mouse, or the like; an output section 1307 including a display such as a cathode ray tube (CRT), a liquid crystal display (LCD), or the like, and a loudspeaker or the like; the storage section 1308 including a hard disk or the like; and a communication section 1309 including a network interface card such as a LAN card, a modem, or the like. The communication section 1309 performs a communication process via the network such as the internet.

A drive 1310 is also connected to the input/output interface 1305 as required. A removable medium 1311, such as a magnetic disk, an optical disk, a magneto-optical disk, a semiconductor memory, or the like, is mounted on the drive 1310 as required, so that a computer program read there from is installed into the storage section 1308 as required.

In the case where the above-described components are implemented by the software, the program that constitutes the software is installed from the network such as the internet or the storage medium such as the removable medium 1311.

Method for Controlling a Jitter Buffer

In the process of describing the apparatus for controlling a jitter buffer in the embodiments hereinbefore, apparently disclosed are also some processes or methods. Hereinafter a summary of these methods is given without repeating some of the details already discussed hereinbefore, but it shall be noted that although the methods are disclosed in the process of describing the apparatus for controlling a jitter buffer, the methods do not necessarily adopt those components as described or are not necessarily executed by those components. For example, the embodiments of the apparatus for controlling a jitter buffer may be realized partially or completely with hardware and/or firmware, while it is possible that the method for controlling a jitter buffers discussed below may be realized totally by a computer-executable program, although the methods may also adopt the hardware and/or firmware of the apparatus for controlling a jitter buffer.

Figure 14:
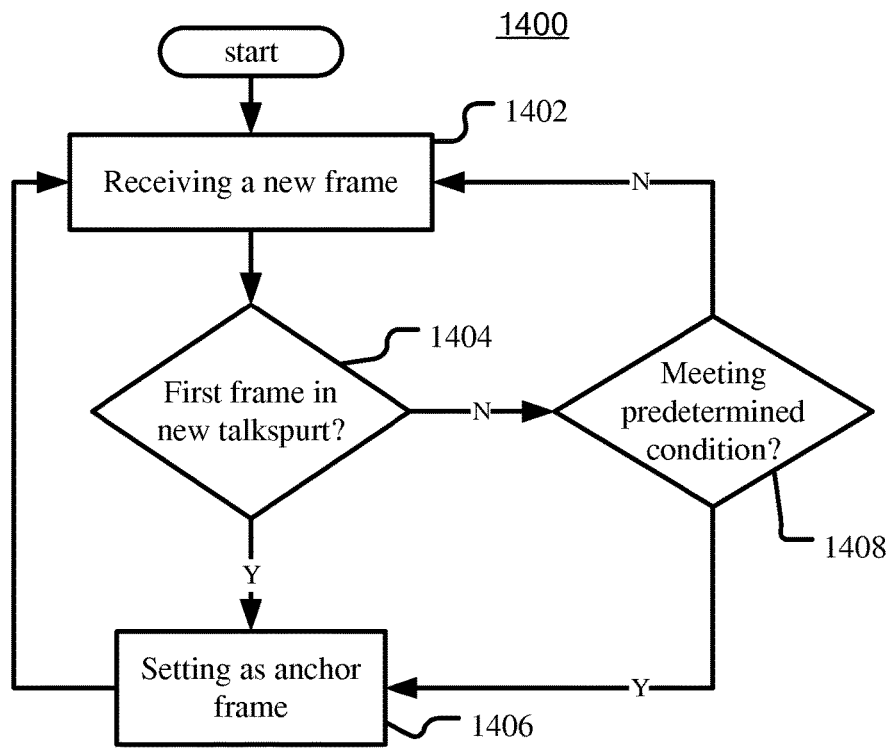
FIG. 14 is a flow chart illustrating setting and updating of anchor frames according to embodiments of the method for controlling a jitter buffer of the present application.
Figure 15:
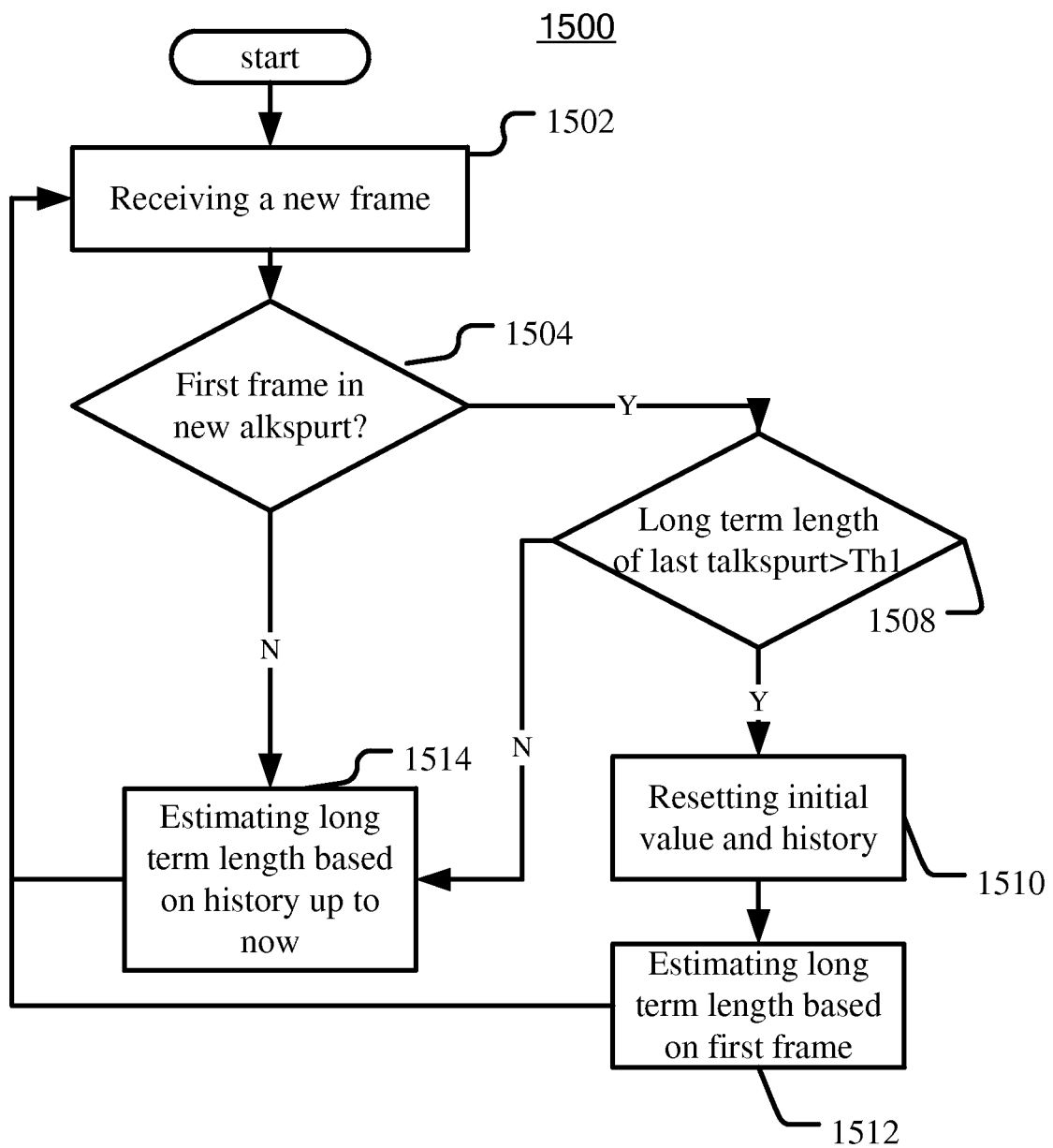
FIG. 15 is a flow chart illustrating estimating of the long term length of the jitter buffer according to embodiments of the method for controlling a jitter buffer of the present application.
Figure 16:
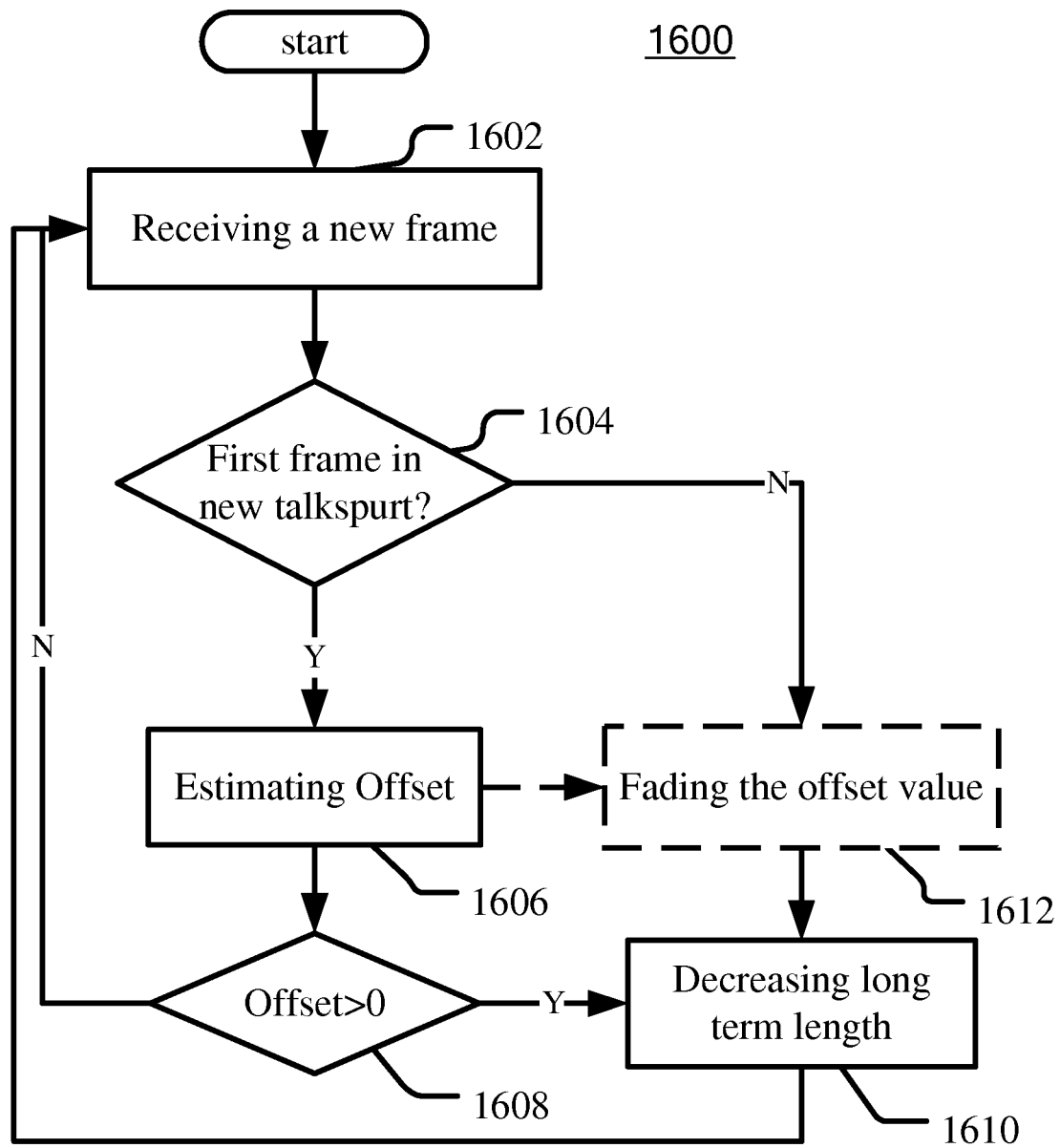
FIG. 16 is a flow chart illustrating estimating of inter-talkspurt offset value and adjusting of the long term length of the jitter buffer according to embodiments of the method for controlling a jitter buffer of the present application.
Figure 17:
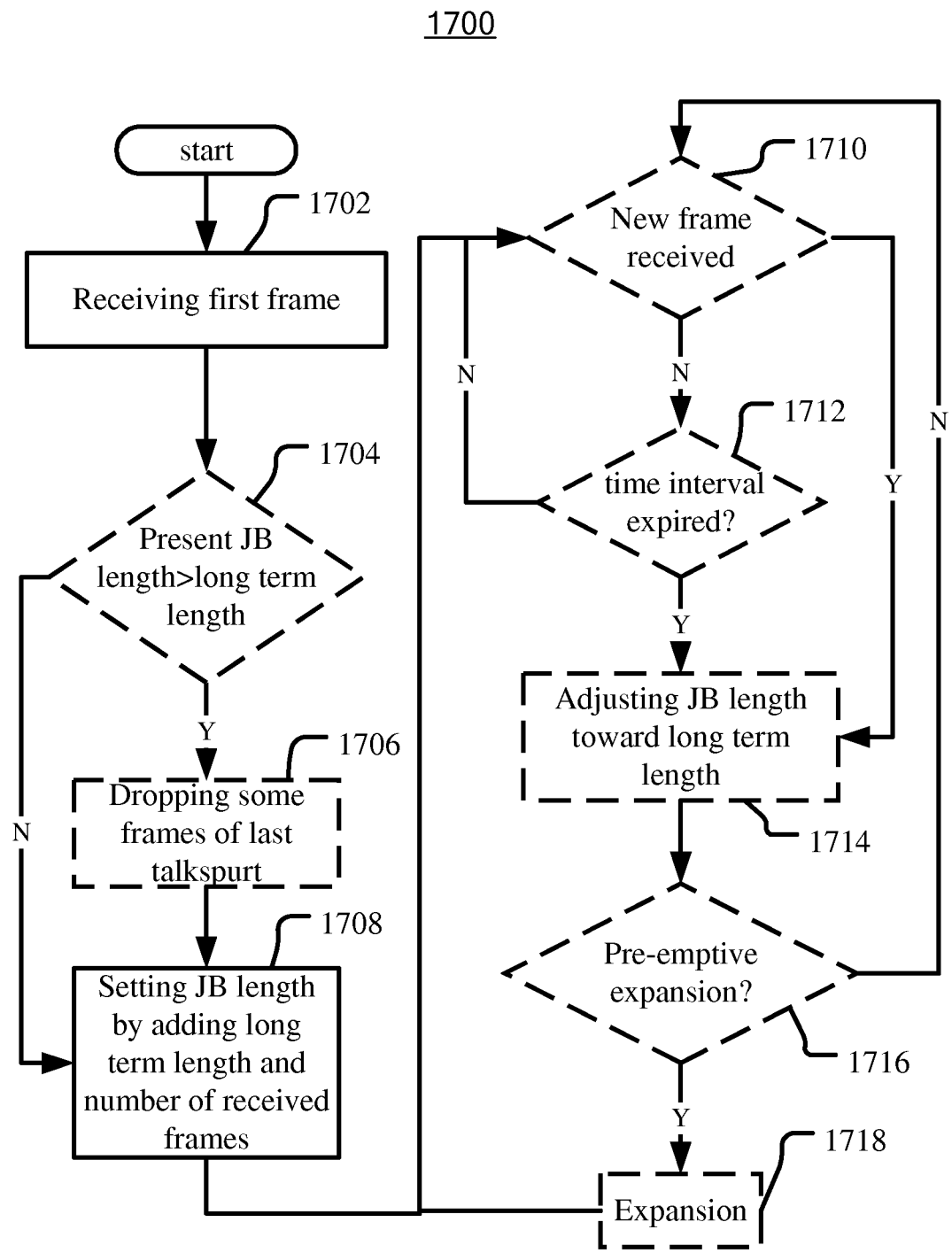
FIG. 17 is a flow chart illustrating updating of jitter buffer length according to embodiments of the method for controlling a jitter buffer of the present application.
Figure 18:
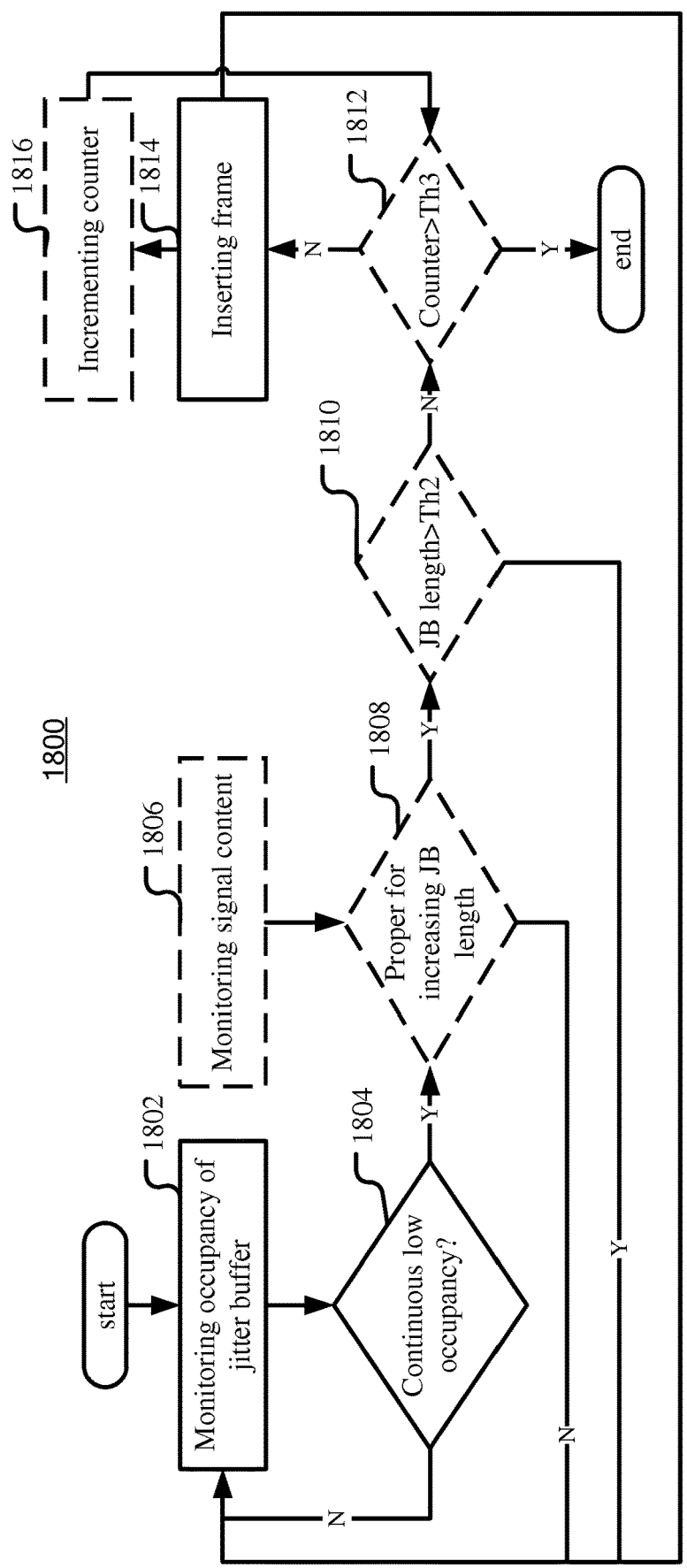
FIG. 18 is a flow chart illustrating pre-emptive expansion of the jitter buffer according to embodiments of the method for controlling a jitter buffer of the present application.

The methods will be described below with reference to FIGS. 14-18. Please note that in correspondence to the streaming property of the audio signal, the control of jitter buffer is a time-dependent process. For different aspects of the control, there are different threads. For example but not intended to be limitative, FIGS. 14-18 show several threads among others. FIG. 14 is a thread 1400 for setting and updating of anchor frames. FIG. 15 is a thread 1500 for estimating the long term length of the jitter buffer. FIG. 16 is a thread 1600 for estimating the cross-talkspurt offset and adjusting the long term length of the jitter buffer. FIG. 17 is a thread 1700 for updating the jitter buffer length. And FIG. 18 is a thread 1800 for pre-emptively expanding the jitter buffer. In each thread, some operations, such as the operation of estimating, may comprise more operations which however are not necessarily shown in FIG. 14-18. In addition, the results of some of the threads will be used by some other threads. Therefore, the embodiments of the methods for controlling a jitter buffer according to the present application may be only a part of one of the threads shown in FIGS. 14-18, or may be a solution bridging different parts of different threads. For those details not illustrated in FIGS. 14-18 and/or not described below, reference may be made to the description of the apparatus for controlling a jitter buffer.

According to a seventh embodiment of the present application, a method for controlling a jitter buffer is provided. According to the method, an offset value of the delay of a first frame in the current talkspurt is estimated with respect to the delay of a latest anchor frame in a previous talkspurt, and is used to, together with a long term length of the jitter buffer for each frame, to adjust a length of the jitter buffer. A positive offset value means the first frame in a new talkspurt probably is delayed too much, that is, has a positive jitter. In such a situation, depending on requirements in practice, the long term length of the jitter buffer may be increased to accommodate possibly greater jitter, or may be decreased to avoid the delay introduced by the jitter buffer is too long.

FIG. 14 shows the setting of the anchor frame. Initially, that is when receiving a new frame (operation 1402) and the new frame is a first frame in a new talkspurt ("Yes" in operation 1404), then the frame is set as anchor frame (operation 1406). Then, newly received frame after the first frame ("No" in operation 1404) may be set as the anchor frame if it meets a predefined condition ("Yes" in operation 1408). That is, the anchor frame may be updated to be the newly received frame.

The predefined condition may be about the delay jitter of the newly received frame. If the delay jitter is less than 0, or equal to 0, then the newly received frame may be set as new anchor frame. In this way, it is ensured that finally a local minimum delay may be located within each talkspurt, thus avoiding the jitter buffer length becomes too long. The delay jitter may be calculated as a difference between an actual reception time of the newly received frame and an expected reception time of the same newly received frame. The expected reception time is calculated with the present anchor frame as a reference.

The offset value mentioned above may be estimated with respect to the latest anchor frame in a previous talkspurt immediately previous to the current talkspurt, or a previous talkspurt not immediately adjacent to the current talkspurt. In this way, some previous talkspurts which are too short or too bad in quality may be neglected, and, similar to the estimation of the intra-spurt delay jitter, it can be ensured that the reference (anchor frame in a previous talkspurt) itself can have relatively small jitter.

Alternatively, when estimating the offset value, the offset value of the delay of the first frame in the current talkspurt may be adjusted based on an average or weighted average of at least one earlier offset value, or adopt the largest offset value among the present offset value and the at least one earlier offset value.

The offset value may be calculated as a time difference between the following two: a real time difference between the reception time of the latest anchor frame and the reception time of the first frame, and an corresponding expected time difference. The expected time difference may be obtained based on an expected number of frames between the latest anchor frame and the first frame.

For getting the expected number of frames, the expected number of frames may be obtained firstly based on sequence numbers of the latest anchor frame and the first frame. Also, information regarding silence frames between the previous talkspurt and the current talkspurt may be retrieved from at least one frame in at least one talkspurt in the previous talkspurt and the current talkspurt.

For example, the information regarding silence frames may include the number of the silence frames, the number being embedded in the first frame of the current talkspurt. Or, the information regarding silence frames may comprise timestamps in the last frame of the previous talkspurt and the first frame in the current talkspurt.

According to an eighth embodiment of the application, the method may further comprise estimating the long term length for each frame by calculating a statistic distribution of history delay jitter values (operation 1512 or operation 1514 in FIG. 15), such as a histogram or a probability mass function (PMF) of the past jitter values. Since the long term length is calculated based on delay jitter values of past frames, the calculation or updating thereof may be triggered by reception of a new frame (operation 1502 in FIG. 15).

As a variation, for avoiding bad quality of a previous talkspurt increases the long term length (and thus the instant jitter buffer length) too much, an opportunity of cutting down too long a jitter buffer is provided upon the start of a new talkspurt ("Yes" in operation 1504). That is, when the long term length at the end of the last talkspurt is greater than a predefined threshold Th1 ("Yes" in operation 1508), the long term length may be reset to an initial value and the history delay jitter values may be emptied (operation 1510). The history data will be re-cumulated from the first frame, and from the first frame on, the long term length will be estimated based on history jitter values since the first frame (operation 1512). If the long term length at the end of the last talkspurt is not greater than a predefined threshold Th1 ("No" in operation 1508), the long term length will not be reset and will be continued to be estimated based on history jitter values since beginning or the last resetting.

In a variation 1600 as shown in FIG. 16, the long term length may be subject to an adjustment based on the offset value, and all the operations relating to the long term length discussed above are based on the adjusted value of the long term length. For example, when the offset value is greater than zero ("Yes" in operation 1608), the long term length may be decreased (operation 1610). In FIG. 16 it is shown that no operations will be performed when the offset is not greater than 0, but the present application is not limited thereto. For example, depending on requirements in practice, sometimes it may be acceptable to increase the long term length when the offset is not greater than 0.

It can be recalled that the offset value is estimated (operation 1606) for the first frame in a new talkspurt ("Yes" in operation 1604). When receiving a new frame (operation 1602) subsequent to the first frame ("No" in operation 1604), the corresponding long term length for each frame may also be adjusted (operation 1610). As a further variation, for each subsequent adjustment to the long term length, the offset value may fade gradually (operation 1612), since the farther away is the subsequent frame from the first frame, the smaller is the effect of the offset of the first frame.

In a ninth embodiment of the application, the operation of adjusting the length of the jitter buffer may comprise, for the first frame of the current talkspurt (operation 1702 in FIG. 17) setting the length of the jitter buffer based on the long term length for the first frame and the number of frames received at the same time with the first frame (operation 1708), so as to ensuring the delay time of the first frame and the buffering space for the other frames already received.

In such a situation, where the jitter buffer length still used by the last talkspurt (that is the present actual jitter buffer length) is greater than the long term length ("Yes" in operation 1704) and the first frame of the new talkspurt has arrived (operation 1802), some of the frames of the last talkspurt may be dropped (operation 1706) so that the frames of the last talkspurt occupy only the long term length of the jitter buffer. If the present jitter buffer length is not greater than the long term length ("No" in operation 1704), then the frames (if any) of the last talkspurt have enough time to be played out before the first frame of the new talkspurt is played out. The excessive time will be occupied by empty frames in the jitter buffer before the first frame.

With the lapse of time ("Yes" in operation 1712) or upon receiving a new frame ("Yes" in operation 1710), the jitter buffer length may be further adjusted toward the long term length (operation 1714). Here, the "time interval" may be the "processing time granularity" as mentioned before, and the word "toward" means the jitter buffer length is adjusted to be closer to the long term length, but not necessarily become equal to the long term length at once.

To adjust the present length of the jitter buffer toward the long term length, we can calculate a weighted average of the long term length and the present length. When the long term length is greater than the present length, the weight of the long term length may be greater so that the jitter buffer length may be increased quickly to the long term length because the situation where the long term length is great generally means the delay is severe and longer jitter buffer is needed to prevent frame loss. On the contrary, when the long term length is smaller than the present length, the weight may be smaller, because in such a situation, the purpose of the adjustment is to release unnecessary length of the jitter buffer so as to shorten the delay time, which is not so urgent as preventing frame loss. Nevertheless, sometimes we may directly set the long term length as the length of the jitter buffer for each frame.

According to a tenth embodiment of the application, the method may further comprise pre-emptively expanding the jitter buffer (operation 1718 in FIG. 17) where necessary ("Yes" in operation 1716), so as to make ready for possible rise of delay jitter.

Such possible rise of delay jitter may be reflected by continuous low occupancy of the jitter buffer, meaning that the receiving of future frames are becoming slower. Therefore, we may monitor the occupancy of the jitter buffer (operation 1802 in FIG. 18), and increase the length of the jitter buffer (operation 1814) in response to the occupancy meeting a predefined condition, such as continuous low occupancy ("Yes" in operation 1804). In a variation, the predefined condition is the occupancy is less than a predetermined threshold consecutively for a predetermined times, such as a single-frame occupancy has consecutively occurred twice.

Since the pre-emptive expansion is based on a prediction, it is better to be cautious so that the jitter buffer length will not be increased too much and too quickly. Therefore we may pose some limitations on the pre-emptive expansion of the jitter buffer.

In one variation, we may monitor the content of the audio signal (operation 1806), and do not increase the length of the jitter buffer if the content of the audio signal is not appropriate for frame insertion ("No" in operation 1808). For example, we may monitor the transient state of the audio signal, and do not increase the length of the jitter buffer in transient signal area because in such area insertion of frame(s) will cause remarkable artifacts.

Further, if the present jitter buffer length is already long, then it is not proper to further increase the jitter buffer length. So we can set a predetermined threshold Th2, beyond which the operation of increasing the length of the jitter buffer will not be performed ("Yes" in operation 1810).

Another criterion is times of frame insertions. We can count frame insertions within the present talkspurt (operation 1816). When the number of frame insertions within the present talkspurt exceeds a predetermined threshold Th3 ("Yes" in operation 1812), the operation of increasing the length of the jitter buffer will not be performed.

Similar to the embodiments of the apparatus for controlling a jitter buffer, any combination of the seventh to tenth embodiment and their variations are practical on one hand; and on the other hand, every aspect of the embodiments and their variations may be separate solutions.

Please note the terminology used herein is for the purpose of describing particular embodiments only and is not intended to be limiting of the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, operations, steps, elements, and/or components, but do not preclude the presence or addition of one or more other features, integers, operations, steps, elements, components, and/or groups thereof.

The corresponding structures, materials, acts, and equivalents of all means or operation plus function elements in the claims below are intended to include any structure, material, or act for performing the function in combination with other claimed elements as specifically claimed. The description of the present application has been presented for purposes of illustration and description, but is not intended to be exhaustive or limited to the application in the form disclosed. Many modifications and variations will be apparent to those of ordinary skill in the art without departing from the scope and spirit of the application. The embodiment was chosen and described in order to best explain the principles of the application and the practical application, and to enable others of ordinary skill in the art to understand the application for various embodiments with various modifications as are suited to the particular use contemplated.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

Accordingly the invention may suitably comprise, consist of, or consist essentially of, any of element (the various parts or features of the invention and their equivalents as described herein, currently existing, and/or as subsequently developed. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

Accordingly, the invention may be embodied in any of the forms described herein, including, but not limited to the following Enumerated Example Embodiments (EEEs) which described structure, features, and functionality of some portions of the present invention.

EEE1. An apparatus for controlling a jitter buffer comprising:
an inter-talkspurt delay jitter estimator for estimating an offset value of the delay of a first frame in the current talkspurt with respect to the delay of a latest anchor frame in a previous talkspurt; and
a jitter buffer controller for adjusting a length of the jitter buffer based on a long term length of the jitter buffer for each frame and the offset value.

EEE2. The apparatus for controlling a jitter buffer according to EEE 1, further comprising an anchor frame setting unit for initially setting the first frame in the current talkspurt as the anchor frame, and setting a newly received frame as the anchor frame when a delay jitter of the newly received frame meets a predefined condition.

EEE3. The apparatus for controlling a jitter buffer according to EEE 2, wherein the predefined condition is the delay jitter is less than 0.

EEE4. The apparatus for controlling a jitter buffer according to EEE 2, wherein the predefined condition is the delay jitter is equal to or less than 0.

EEE5. The apparatus for controlling a jitter buffer according any one of EEE's 1-4, further comprising an intra-talkspurt delay jitter estimator for calculating, as the delay jitter, a difference between an actual reception time of the newly received frame and an expected reception time of the same newly received frame, the expected reception time being calculated with the present anchor frame as a reference.

EEE6. The apparatus for controlling a jitter buffer according to any one of EEE's 1-5, wherein the inter-talkspurt delay jitter estimator is configured to estimate the offset value of the delay of the first frame in the current talkspurt with respect to the delay of the latest anchor frame in a previous talkspurt immediately previous to the current talkspurt.

EEE7. The apparatus for controlling a jitter buffer according to EEE 6, wherein the inter-talkspurt delay jitter estimator comprises:
a time difference estimator for calculating a time difference between the reception time of the latest anchor frame and the reception time of the first frame, and
a frame number estimator for estimating an expected number of frames between the latest anchor frame and the first frame; and wherein
the inter-talkspurt delay jitter estimator is configured to estimate the offset value based on the time difference and an expected time difference obtained based on the expected number of frames.

EEE8. The apparatus for controlling a jitter buffer according to EEE 7, wherein the frame number estimator is configured to obtain the expected number of frames based on sequence numbers of the latest anchor frame and the first frame and information regarding silence frames between the previous talkspurt and the current talkspurt, the information regarding silence frames being carried in at least one frame in at least one talkspurt in the previous talkspurt and the current talkspurt.

EEE9. The apparatus for controlling a jitter buffer according to EEE 8, wherein the information regarding silence frames comprises the number of the silence frames, the number being embedded in the first frame of the current talkspurt.

EEE10. The apparatus for controlling a jitter buffer according to EEE 8, wherein the information regarding silence frames comprises timestamps in the last frame of the previous talkspurt and the first frame in the current talkspurt.

EEE11. The apparatus for controlling a jitter buffer according to any one of EEE;s 1-10, further comprising an offset buffer for storing at least one earlier offset value of at least one first frame in at least one earlier talkspurt, wherein the inter-talkspurt delay jitter estimator is configured to adjust the offset value of the delay of the first frame in the current talkspurt based on an average or weighted average of the at least one earlier offset value, or adopt the largest offset value among the present offset value and the at least one earlier offset value.

EEE12. The apparatus for controlling a jitter buffer according to any one of EEE's 1-11, further comprising a long term length estimator for estimating the long term length for each frame by calculating a statistical distribution of history delay jitter values.

EEE13. The apparatus for controlling a jitter buffer according to any one of EEE's 1-12, further comprising a long term length adjustor for adjusting the long term length for each frame to a smaller value when the offset value is greater than zero.

EEE14. The apparatus for controlling a jitter buffer according to EEE 13, wherein the long term length adjustor is configured to fade the offset value with time.

EEE15. The apparatus for controlling a jitter buffer according to any one of EEE's 12-14, wherein the long term length estimator is configured to reset the long term length to an initial value and reset the history delay jitter values when the long term length at the end of the last talkspurt is greater than a predefined threshold.

EEE16. The apparatus for controlling a jitter buffer according to any one of EEE's 1-15, wherein the jitter buffer controller is configured to set the length of the jitter buffer for the first frame of the current talkspurt based on the long term length for the first frame and the number of frames received at the same time with the first frame.

EEE17. The apparatus for controlling a jitter buffer according to any one of EEE's 1-16, wherein, the jitter buffer controller is configured to, if the jitter buffer length still used by the last talkspurt is greater than the long term length and the first frame of the new talkspurt has arrived, drop some of the frames of the last talkspurt so that the frames of the last talkspurt occupy only the long term length of the jitter buffer.

EEE18. The apparatus for controlling a jitter buffer according to any one of EEE's 1-17, wherein the jitter buffer controller is further configured to adjust the present length of the jitter buffer toward the long term length.

EEE19. The apparatus for controlling a jitter buffer according to EEE 18, wherein the jitter buffer controller is configured to adjust the present length of the jitter buffer by calculating a weighted average of the long term length and the present length.

EEE20. The apparatus for controlling a jitter buffer according to EEE 19, wherein the weight of the long term length is greater when the long term length is greater than the present length, and is smaller when the long term length is smaller than the present length.

EEE21. The apparatus for controlling a jitter buffer according to any one of EEE's 1-20, wherein the jitter buffer controller is configured to determine the length of the jitter buffer for each frame as the long term length.

EEE22. An apparatus for controlling a jitter buffer comprising:
a long term length estimator for estimating a long term length of the jitter buffer for each frame by calculating a statistic distribution of history delay jitter values; and
a jitter buffer controller for setting the length of the jitter buffer; and wherein
the jitter buffer controller is configured to set the length of the jitter buffer for the first frame of the current talkspurt based on the long term length for the first frame and the number of frames received at the same time with the first frame.

EEE23. The apparatus for controlling a jitter buffer according to EEE 22, wherein, the jitter buffer controller is configured to, if the jitter buffer length still used by the last talkspurt is greater than the long term length and the first frame of the new talkspurt has arrived, drop some of the frames of the last talkspurt so that the frames of the last talkspurt occupy only the long term length of the jitter buffer.

EEE24. The apparatus for controlling a jitter buffer according to EEE22 or EEE23, wherein the jitter buffer controller is further configured to adjust the present length of the jitter buffer toward the long term length.

EEE25. The apparatus for controlling a jitter buffer according to EEE 24, wherein the jitter buffer controller is configured to adjust the present length of the jitter buffer by calculating a weighted average of the long term length and the present length.

EEE26. The apparatus for controlling a jitter buffer according to EEE 25, wherein the weight of the long term length is greater when the long term length is greater than the present length, and is smaller when the long term length is smaller than the present length.

EEE27. An apparatus for controlling a jitter buffer comprising:
a long term length estimator for estimating a long term length of the jitter buffer for each frame by calculating a statistic distribution of history delay jitter values; and
a jitter buffer controller for adjusting the present length of the jitter buffer toward the long term length.

EEE28. The apparatus for controlling a jitter buffer according to claim 27, wherein the jitter buffer controller is configured to adjust the present length of the jitter buffer by calculating a weighted average of the long term length and the present length.

EEE29. The apparatus for controlling a jitter buffer according to EEE 28, wherein the weight of the long term length is greater when the long term length is greater than the present length, and is smaller when the long term length is smaller than the present length.

EEE30. The apparatus for controlling a jitter buffer according to any one of EEE's 1-29, further comprising a jitter buffer monitor for monitoring occupancy of the jitter buffer, and wherein the jitter buffer controller is further configured to increase the length of the jitter buffer in response to the occupancy meeting a predefined condition.

EEE31. The apparatus for controlling a jitter buffer according to EEE 30, wherein the jitter buffer controller is configured to increase the length of the jitter buffer where an occupancy less than a predetermined threshold has consecutively occurred for a predetermined times.

EEE32. The apparatus for controlling a jitter buffer according to EEE 31, wherein the jitter buffer controller is configured to increase the length of the jitter buffer where a single-frame occupancy has consecutively occurred twice.

EEE33. The apparatus for controlling a jitter buffer according to any one of EEE's 30-32, wherein the jitter buffer controller is configured to increase the length of the jitter buffer by one frame each time.

EEE34. The apparatus for controlling a jitter buffer according to any one of EEE's 30-32, further comprising a signal content monitor for monitoring the content of the audio signal, and wherein the jitter buffer controller is configured not to increase the length of the jitter buffer where the content of the audio signal is not appropriate for frame insertion.

EEE35. The apparatus for controlling a jitter buffer according to EEE 34, wherein the signal content monitor is configured to monitor the transient state of the audio signal, and the jitter buffer controller is configured not to increase the length of the jitter buffer in transient signal area.

EEE36. The apparatus for controlling a jitter buffer according to any one of EEE's 30-32, wherein the jitter buffer controller is configured to not increase the length of the jitter buffer where the present jitter buffer length exceeds a predetermined threshold.

EEE37. The apparatus for controlling a jitter buffer according to any one of EEE's 30-32, further comprising a counter for counting frame insertions within the present talkspurt, wherein the jitter buffer controller is configured to not increase the length of the jitter buffer where the number of frame insertions within the present talkspurt exceeds a predetermined threshold.

EEE38. An apparatus for controlling a jitter buffer, comprising:
 a jitter buffer monitor for monitoring occupancy of the jitter buffer, and
 a jitter buffer controller for increasing the length of the jitter buffer in response to the occupancy meeting a predefined condition.

EEE39. The apparatus for controlling a jitter buffer according to EEE 38, wherein the jitter buffer controller is configured to increase the length of the jitter buffer where an occupancy less than a predetermined threshold has consecutively occurred for a predetermined times.

EEE40. The apparatus for controlling a jitter buffer according to EEE 39, wherein the jitter buffer controller is configured to increase the length of the jitter buffer where a single-frame occupancy has consecutively occurred twice.

EEE41. The apparatus for controlling a jitter buffer according to any one of EEE's 38-40, wherein the jitter buffer controller is configured to increase the length of the jitter buffer by one frame each time.

EEE42. The apparatus for controlling a jitter buffer according to any one of EEE's 38-40, further comprising a signal content monitor for monitoring the content of the audio signal, and wherein the jitter buffer controller is configured not to increase the length of the jitter buffer where the content of the audio signal is not appropriate for frame insertion.

EEE43. The apparatus for controlling a jitter buffer according to EEE 42, wherein the signal content monitor is configured to monitor the transient state of the audio signal, and the jitter buffer controller is configured not to increase the length of the jitter buffer in transient signal area.

EEE44. The apparatus for controlling a jitter buffer according to any one of EEE's 38-40, wherein the jitter buffer controller is configured to not increase the length of the jitter buffer where the present jitter buffer length exceeds a predetermined threshold.

EEE45. The apparatus for controlling a jitter buffer according to any one of EEE's 38-40, further comprising a counter for counting frame insertions within the present talkspurt, wherein the jitter buffer controller is configured to not increase the length of the jitter buffer where the number of frame insertions within the present talkspurt exceeds a predetermined threshold.

EEE46. A method for controlling a jitter buffer comprising:
 estimating an offset value of the delay of a first frame in the current talkspurt with respect to the delay of a latest anchor frame in a previous talkspurt; and
 adjusting a length of the jitter buffer based on a long term length of the jitter buffer for each frame and the offset value.

EEE47. The method for controlling a jitter buffer according to claim 46, further comprising initially setting the first frame in the current talkspurt as the anchor frame, and setting a newly received frame as the anchor frame when a delay jitter of the newly received frame meets a predefined condition.

EEE48. The method for controlling a jitter buffer according to EEE 47, wherein the predefined condition is the delay jitter is less than 0.

EEE49. The method for controlling a jitter buffer according to EEE 47, wherein the predefined condition is the delay jitter is equal to or less than 0.

EEE50. The method for controlling a jitter buffer according any one of EEE's 46-49, further comprising calculating, as the delay jitter, a difference between an actual reception time of the newly received frame and an expected reception time of the same newly received frame, the expected reception time being calculated with the present anchor frame as a reference.

EEE51. The method for controlling a jitter buffer according to any one of EEE's 46-50, wherein the operation of estimating the offset value comprises estimating the offset value of the delay of the first frame in the current talkspurt with respect to the delay of the latest anchor frame in a previous talkspurt immediately previous to the current talkspurt.

EEE52. The method for controlling a jitter buffer according to EEE 51, wherein the operation of estimating the offset value comprises:
 calculating a time difference between the reception time of the latest anchor frame and the reception time of the first frame;
 estimating an expected number of frames between the latest anchor frame and the first frame; and
 estimating the offset value based on the time difference and an expected time difference obtained based on the expected number of frames.

EEE53. The method for controlling a jitter buffer according to EEE 52, wherein the operation of estimating the expected number of frames comprises obtaining the expected number of frames based on sequence numbers of the latest anchor frame and the first frame and information regarding silence frames between the previous talkspurt and the current talkspurt, the information regarding silence frames being carried in at least one frame in at least one talkspurt in the previous talkspurt and the current talkspurt.

EEE54. The method for controlling a jitter buffer according to EEE 53, wherein the information regarding silence frames comprises the number of the silence frames, the number being embedded in the first frame of the current talkspurt.

EEE55. The method for controlling a jitter buffer according to EEE 53, wherein the information regarding silence frames comprises timestamps in the last frame of the previous talkspurt and the first frame in the current talkspurt.

EEE56. The method for controlling a jitter buffer according to any one of EEE's 46-55, wherein the operation of estimating the offset value further comprises adjusting the offset value of the delay of the first frame in the current talkspurt based on an average or weighted average of at least one earlier offset value, or adopt the largest offset value among the present offset value and the at least one earlier offset value.

EEE57. The method for controlling a jitter buffer according to any one of EEE's 46-56, further comprising estimating the long term length for each frame by calculating a statistic distribution of history delay jitter values.

EEE58. The method for controlling a jitter buffer according to any one of EEE's 46-57, further comprising adjusting the long term length for each frame to a smaller value when the offset value is greater than zero.

EEE59. The method for controlling a jitter buffer according to EEE 58, further comprising fading the offset value with time.

EEE60. The method for controlling a jitter buffer according to any one of EEE's 57-59, wherein the operation of estimating the long term length comprising resetting the long term length to an initial value and resetting the history delay jitter values when the long term length at the end of the last talkspurt is greater than a predefined threshold.

EEE61. The method for controlling a jitter buffer according to any one of EEE's 46-60, wherein the operation of adjusting the length of the jitter buffer comprises setting the length of the jitter buffer for the first frame of the current talkspurt based on the long term length for the first frame and the number of frames received at the same time with the first frame.

EEE62. The method for controlling a jitter buffer according to any one of EEE's 46-61, further comprising: if the jitter buffer length still used by the last talkspurt is greater than the long term length and the first frame of the new talkspurt has arrived, dropping some of the frames of the last talkspurt so that the frames of the last talkspurt occupy only the long term length of the jitter buffer.

EEE63. The method for controlling a jitter buffer according to any one of EEE's 46-62, wherein the operation of adjusting the length of the jitter buffer comprises adjusting the present length of the jitter buffer toward the long term length.

EEE64. The method for controlling a jitter buffer according to EEE 63, wherein the operation of adjusting the present length of the jitter buffer toward the long term length comprises calculating a weighted average of the long term length and the present length.

EEE65. The method for controlling a jitter buffer according to EEE 64, wherein the weight of the long term length is greater when the long term length is greater than the present length, and is smaller when the long term length is smaller than the present length.

EEE66. The method for controlling a jitter buffer according to any one of EEE's 46-65, wherein the operation of adjusting the length of the jitter buffer comprises determining the length of the jitter buffer for each frame as the long term length.

EEE67. A method for controlling a jitter buffer comprising:
    estimating a long term length of the jitter buffer for each frame by calculating a statistic distribution of history delay jitter values; and
    setting the length of the jitter buffer for the first frame of the current talkspurt based on the long term length for the first frame and the number of frames received at the same time with the first frame.

EEE68. The method for controlling a jitter buffer according to EEE 67, further comprising: if the jitter buffer length still used by the last talkspurt is greater than the long term length and the first frame of the new talkspurt has arrived, dropping some of the frames of the last talkspurt so that the frames of the last talkspurt occupy only the long term length of the jitter buffer.

EEE69. The method for controlling a jitter buffer according to EEE 67 or 68, further comprising adjusting the present length of the jitter buffer toward the long term length.

EEE70. The method for controlling a jitter buffer according to EEE 69, wherein the operation of adjusting the present length of the jitter buffer toward the long term length comprises calculating a weighted average of the long term length and the present length.

EEE71. The method for controlling a jitter buffer according to EEE 70, wherein the weight of the long term length is greater when the long term length is greater than the present length, and is smaller when the long term length is smaller than the present length.

EEE72. A method for controlling a jitter buffer comprising:
    estimating a long term length of the jitter buffer for each frame by calculating a statistic distribution of history delay jitter values; and
    adjusting the present length of the jitter buffer toward the long term length.

EEE73. The method for controlling a jitter buffer according to EEE 72, wherein the operation of adjusting the present length of the jitter buffer toward the long term length comprises calculating a weighted average of the long term length and the present length.

EEE74. The method for controlling a jitter buffer according to EEE 73, wherein the weight of the long term length is greater when the long term length is greater than the present length, and is smaller when the long term length is smaller than the present length.

EEE75. The method for controlling a jitter buffer according to any one of EEe's 46-74, further comprising:
    monitoring occupancy of the jitter buffer; and
    increasing the length of the jitter buffer in response to the occupancy meeting a predefined condition.

EEE76. The method for controlling a jitter buffer according to EEE 75, wherein the operation of increasing the length of the jitter buffer comprises increasing the length of the jitter buffer where an occupancy less than a predetermined threshold has consecutively occurred for a predetermined times.

EEE77. The method for controlling a jitter buffer according to EEE 76, wherein the operation of increasing the length of the jitter buffer comprises increasing the length of the jitter buffer where a single-frame occupancy has consecutively occurred twice.

EEE78. The method for controlling a jitter buffer according to any one of EEE's 75-77, wherein the operation of increasing the length of the jitter buffer is configured to increase the length of the jitter buffer by one frame each time.

EEE79. The method for controlling a jitter buffer according to any one of EEE's 75-77, further comprising monitoring the content of the audio signal, and wherein the operation of increasing the length of the jitter buffer is not performed where the content of the audio signal is not appropriate for frame insertion.

EEE80. The method for controlling a jitter buffer according to EEE 79, wherein the operation of monitoring the content of the audio signal comprises monitoring the transient state of the audio signal, and wherein the operation of increasing the length of the jitter buffer is not performed in transient signal area.

EEE81. The method for controlling a jitter buffer according to any one of EEE's 75-77, wherein the operation of increasing the length of the jitter buffer is not performed where the present jitter buffer length exceeds a predetermined threshold.

EEE82. The method for controlling a jitter buffer according to any one of EEE's 75-77, further comprising counting frame insertions within the present talkspurt, and wherein the operation of increasing the length of the jitter buffer is not performed where the number of frame insertions within the present talkspurt exceeds a predetermined threshold.

EEE83. A method for controlling a jitter buffer, comprising: monitoring occupancy of the jitter buffer, and increasing the length of the jitter buffer in response to the occupancy meeting a predefined condition.

EEE84. The method for controlling a jitter buffer according to EEE 83, wherein the operation of increasing the length of the jitter buffer comprises increasing the length of the jitter buffer where an occupancy less than a predetermined threshold has consecutively occurred for a predetermined times.

EEE85. The method for controlling a jitter buffer according to EEE 84, wherein the operation of increasing the length of the jitter buffer comprises increasing the length of the jitter buffer where a single-frame occupancy has consecutively occurred twice.

EEE86. The method for controlling a jitter buffer according to any one of EEE 83-85, wherein the operation of increasing the length of the jitter buffer is configured to increase the length of the jitter buffer by one frame each time.

EEE87. The method for controlling a jitter buffer according to any one of EEE's 83-85, further comprising monitoring the content of the audio signal, and wherein the operation of increasing the length of the jitter buffer is not performed where the content of the audio signal is not appropriate for frame insertion.

EEE88. The method for controlling a jitter buffer according to EEE 87, wherein the operation of monitoring the content of the audio signal comprises monitoring the transient state of the audio signal, and wherein the operation of increasing the length of the jitter buffer is not performed in transient signal area.

EEE89. The method for controlling a jitter buffer according to any one of EEE's 83-85, wherein the operation of increasing the length of the jitter buffer is not performed where the present jitter buffer length exceeds a predetermined threshold.

EEE90. The method for controlling a jitter buffer according to any one of EEE's 83-85, further comprising counting frame insertions within the present talkspurt, and wherein the operation of increasing the length of the jitter buffer is not performed where the number of frame insertions within the present talkspurt exceeds a predetermined threshold.

EEE91. A computer-readable medium having computer program instructions recorded thereon, when being executed by a processor, the instructions enabling the processor to execute a method for controlling a jitter buffer comprising:
estimating an offset value of the delay of a first frame in the current talkspurt with respect to the delay of a latest anchor frame in a previous talkspurt; and
adjusting a length of the jitter buffer based on a long term length of the jitter buffer for each frame and the offset value.

EEE92. A computer-readable medium having computer program instructions recorded thereon, when being executed by a processor, the instructions enabling the processor to execute a method for controlling a jitter buffer comprising:
estimating a long term length of the jitter buffer for each frame by calculating a statistic distribution of history delay jitter values; and
setting the length of the jitter buffer for the first frame of the current talkspurt based on the long term length for the first frame and the number of frames received at the same time with the first frame.

EEE93. A computer-readable medium having computer program instructions recorded thereon, when being executed by a processor, the instructions enabling the processor to execute a method for controlling a jitter buffer comprising:
estimating a long term length of the jitter buffer for each frame by calculating a statistic distribution of history delay jitter values; and
adjusting the present length of the jitter buffer toward the long term length.

EEE94. A computer-readable medium having computer program instructions recorded thereon, when being executed by a processor, the instructions enabling the processor to execute a method for controlling a jitter buffer, comprising:
monitoring occupancy of the jitter buffer, and
increasing the length of the jitter buffer in response to the occupancy meeting a predefined condition.

Accordingly, the scope of the invention is to be construed in accordance with the substance defined by the following claims.

The invention claimed is:

1. An apparatus for controlling a jitter buffer comprising:
an inter-talkspurt delay jitter estimator for estimating an offset value of the delay of a first frame in a current talkspurt with respect to the delay of a latest anchor frame in a previous talkspurt before the current talkspurt;
an offset buffer for storing a plurality of earlier offset values, estimated by the inter-talkspurt delay jitter estimator, of at least one first frame in a plurality of earlier talkspurts that includes the previous talkspurt;
a jitter buffer controller for adjusting a length of the jitter buffer based on a long term length of the jitter buffer and the offset value;
an anchor frame setting unit for initially setting the first frame in the current talkspurt as the anchor frame, and setting a newly received frame as the anchor frame when a delay jitter of the newly received frame meets a predefined condition;
a signal content monitor for monitoring a content of the current talkspurt, wherein when the content is not appropriate for frame insertion, the signal content monitor instructs the jitter buffer controller not to increase the length of the jitter buffer; and
a loudspeaker that outputs an output from the jitter buffer having been adjusted, wherein the inter-talkspurt delay jitter estimator is configured to adjust an offset value of the delay of a first frame on a current talkspurt based on an average or weighted average of the plurality of earlier offset values stored in the offset buffer, and wherein a long term length is determined based on jitter values in a history buffer and data in the history buffer is updated when a new frame is received.

2. The apparatus for controlling a jitter buffer according to claim 1, wherein the predefined condition is the delay jitter is equal to or less than 0.

3. The apparatus for controlling a jitter buffer according to claim 1, further comprising an intra-talkspurt delay jitter estimator for calculating, as the delay jitter, a difference between an actual reception time of the newly received frame and an expected reception time of the same newly received frame, the expected reception time being calculated with the present anchor frame as a reference.

4. The apparatus for controlling a jitter buffer according to claim 1, wherein the inter-talkspurt delay jitter estimator is configured to estimate the history value of the delay of the first frame in the current talkspurt with respect to the delay of the latest anchor frame in a previous talkspurt immediately previous to the current talkspurt.

5. The apparatus for controlling a jitter buffer according to claim 4, wherein the inter-talkspurt delay jitter estimator comprises:
a time difference estimator for calculating a time difference between the reception time of the latest anchor frame and the reception time of the first frame, and
a frame number estimator for estimating an expected number of frames between the latest anchor frame and the first frame; and wherein
the inter-talkspurt delay jitter estimator is configured to estimate the offset value based on the time difference and an expected time difference obtained based on the expected number of frames.

6. The apparatus for controlling a jitter buffer according to claim 1, further comprising an offset buffer for storing at least one earlier offset value of at least one first frame in at least one earlier talkspurt, wherein the inter-talkspurt delay jitter estimator is configured to adjust the offset value of the delay of the first frame in the current talkspurt based on an average or weighted average of the at least one earlier offset value, or adopt the largest offset value among the present offset value and the at least one earlier offset value.

7. The apparatus for controlling a jitter buffer according to claim 1, further comprising a long term length estimator for estimating the long term length for each frame by calculating a statistical distribution of history delay jitter values.

8. A method for controlling a jitter buffer comprising:
estimating an offset value of the delay of a first frame in a current talkspurt with respect to the delay of a latest anchor frame in a previous talkspurt before the current talkspurt;
storing a plurality of earlier offset values, having been estimated with respect to the delay of the latest anchor frame in the previous talkspurt, of at least one first frame in a plurality of earlier talkspurts that includes the previous talkspurt; and
adjusting a length of the jitter buffer based on a long term length of the jitter buffer and the offset value,
the method further comprising:
initially setting the first frame in the current talkspurt as the anchor frame;
setting a newly received frame as the anchor frame when a delay jitter of the newly received frame meets a predefined condition;
monitoring a content of the current talkspurt, wherein when the content is not appropriate for frame insertion, the length of the jitter buffer is not increased; and
outputting an output from the jitter buffer having been adjusted, wherein the inter-talkspurt delay jitter estimator is configured to adjust an offset value of the delay of a first frame on a current talkspurt based on an average or weighted average of the plurality of earlier offset values having been stored, and wherein a long term length is determined based on jitter values in a history buffer and data in the history buffer is updated when a new frame is received.

9. The method for controlling a jitter buffer according to claim 8, wherein the predefined condition is the delay jitter is equal to or less than 0.

10. The method for controlling a jitter buffer according to claim 8, further comprising calculating, as the delay jitter, a difference between an actual reception time of the newly received frame and an expected reception time of the same newly received frame, the expected reception time being calculated with the present anchor frame as a reference.

11. The method for controlling a jitter buffer according to claim 8, wherein the operation of estimating the offset value comprises estimating the offset value of the delay of the first frame in the current talkspurt with respect to the delay of the latest anchor frame in a previous talkspurt immediately previous to the current talkspurt.

12. The method for controlling a jitter buffer according to claim 11, wherein the operation of estimating the offset value comprises:
calculating a time difference between the reception time of the latest anchor frame and the reception time of the first frame;
estimating an expected number of frames between the latest anchor frame and the first frame; and
estimating the offset value based on the time difference and an expected time difference obtained based on the expected number of frames.

13. The apparatus for controlling a jitter buffer according to claim 7, wherein the long term length estimator is configured to reset the long term length to a predefined initial value when the long term length at the end of the previous talkspurt is greater than a predefined threshold.

14. The apparatus for controlling a jitter buffer according to claim 1, further comprising:
a jitter buffer monitor for monitoring an occupancy of the jitter buffer,
wherein the jitter buffer controller is configured to increase the length of the jitter buffer in response to the occupancy meeting a predefined occupancy condition.

15. The apparatus for controlling a jitter buffer according to claim 14, wherein the jitter buffer controller is configured to increase the length of the jitter buffer by one frame each time the occupancy meets the predefined occupancy condition.

16. The method for controlling a jitter buffer according to claim 8, further comprising:
monitoring an occupancy of the jitter buffer; and
increasing the length of the jitter buffer in response to the occupancy meeting a predefined occupancy condition.

17. The method for controlling a jitter buffer according to claim 16, wherein the length of the jitter buffer is increased by one frame each time the occupancy meets the predefined occupancy condition.

18. The apparatus for controlling a jitter buffer according to claim 1, wherein the signal content monitor monitors a transient state of the current talkspurt.

19. The apparatus for controlling a jitter buffer according to claim 1, wherein the signal content monitor monitors a transient state of the current talkspurt, and wherein the signal content monitor instructs the jitter buffer controller not to increase the length of the jitter buffer when the transient state corresponds to a transient signal area.

20. The method for controlling a jitter buffer according to claim 8, wherein monitoring the content of the current talkspurt includes monitoring a transient state of the current talkspurt.

* * * * *